(12) United States Patent
Briscoe et al.

(10) Patent No.: US 7,535,853 B2
(45) Date of Patent: May 19, 2009

(54) COMMUNICATIONS NETWORK

(75) Inventors: Robert J Briscoe, Suffolk (GB); Michael Rizzo, Suffolk (GB)

(73) Assignee: British Telecommunications public limited company, London (GB)

( * ) Notice: Subject to any disclaimer, the term of this patent is extended or adjusted under 35 U.S.C. 154(b) by 620 days.

(21) Appl. No.: 11/216,349

(22) Filed: Sep. 1, 2005

(65) Prior Publication Data

US 2005/0286488 A1 Dec. 29, 2005

Related U.S. Application Data

(62) Division of application No. 09/674,717, filed as application No. PCT/GB99/01765 on Jun. 4, 1999, now Pat. No. 7,319,673.

(30) Foreign Application Priority Data

| Jun. 5, 1998 | (GB) | ................................. | 9812161.9 |
| Nov. 24, 1998 | (EP) | ................................. | 98309609 |
| Nov. 24, 1998 | (GB) | ................................. | 9825723.1 |
| Jan. 29, 1999 | (GB) | ................................. | 9902052.1 |
| Feb. 5, 1999 | (GB) | ................................. | 9902648.6 |

(51) Int. Cl.
*H04L 1/00* (2006.01)
*H04J 3/14* (2006.01)

(52) U.S. Cl. .................................................. 370/252

(58) Field of Classification Search ................. 370/357, 370/389, 235, 329, 401; 709/202; 375/240; 726/11, 13, 22, 14
See application file for complete search history.

(56) References Cited

U.S. PATENT DOCUMENTS

| 4,756,019 A | 7/1988 | Szybicki |
| 4,796,297 A | 1/1989 | Okamoto |

(Continued)

FOREIGN PATENT DOCUMENTS

DK  4241434 A1  6/1994

(Continued)

OTHER PUBLICATIONS

Sietmann R; "Tarifmodelle Gegen Staus Auf Der Infobahn"; Funkschau; vol. 71, No. 8; Apr. 3, 1998; pp. 28-30; XP000779238.

(Continued)

*Primary Examiner*—Wing F Chan
*Assistant Examiner*—Prenell P Jones
(74) *Attorney, Agent, or Firm*—Nixon & Vanderhye P.C.

(57) ABSTRACT

In a communications network, which may be a federated network such as the Internet, a tariff is distributed via the network to customer terminals. At each terminal a charge for use of the network is calculated by using the tariff. Different tariffs may be communicated for different services and a respective tariff may be varied depending upon the operational condition of the service. Different tariffs may be calculated for different customers and the tariffs may be varied in dependence upon the loading of network resources and different tariffs may have different volatilities. Part of the traffic from a user to the network may be sampled and the status of the user may be amended when a discrepancy is detected between the sampled parameters and the contracted parameters in the users contract.

11 Claims, 14 Drawing Sheets

U.S. PATENT DOCUMENTS

| | | | |
|---|---|---|---|
| 4,896,319 | A | 1/1990 | Lidinsky et al. |
| 5,067,149 | A | 11/1991 | Schneid et al. |
| 5,440,547 | A | 8/1995 | Easki et al. |
| 5,631,897 | A | 5/1997 | Pacheco et al. |
| 5,751,799 | A | 5/1998 | Mori |
| 5,956,331 | A | 9/1999 | Rautiola et al. |
| 5,978,456 | A | 11/1999 | Takeuchi et al. |
| 6,005,926 | A | 12/1999 | Mashinsky |
| 6,032,132 | A | 2/2000 | Nelson |
| 6,088,659 | A | 7/2000 | Kelley et al. |
| 6,098,878 | A | 8/2000 | Dent et al. |
| 6,108,330 | A | 8/2000 | Bhatia et al. |
| 6,118,768 | A | 9/2000 | Bhatia et al. |
| 6,128,601 | A | 10/2000 | Van Horne et al. |
| 6,144,727 | A | 11/2000 | Mashinsky |
| 6,154,445 | A | 11/2000 | Farris et al. |
| 6,226,365 | B1 | 5/2001 | Mashinsky |
| 6,324,522 | B2 | 11/2001 | Peterson et al. |
| 6,338,046 | B1 | 1/2002 | Saari et al. |
| 6,351,737 | B1 | 2/2002 | Williams |
| 6,408,174 | B1 | 6/2002 | Steijer |
| 6,480,470 | B1 | 11/2002 | Breivik |
| 6,542,588 | B1 | 4/2003 | Mashinsky |
| 6,625,657 | B1 | 9/2003 | Bullard |
| 6,667,956 | B2 | 12/2003 | Beshai et al. |
| 6,714,979 | B1 | 3/2004 | Brandt et al. |
| 7,319,673 | B1 * | 1/2008 | Briscoe et al. ............. 370/252 |
| 7,336,613 | B2 * | 2/2008 | Lloyd et al. ................ 370/237 |
| 2001/0051951 | A1 | 12/2001 | Nishikawa |
| 2002/0091574 | A1 | 7/2002 | Lefebvre et al. |
| 2004/0024717 | A1 | 2/2004 | Sneeringer |
| 2008/0091766 | A1 * | 4/2008 | Briscoe et al. ............. 709/202 |

FOREIGN PATENT DOCUMENTS

| | | |
|---|---|---|
| EP | 0 622 941 A2 | 11/1994 |
| EP | 0622941 A2 | 11/1994 |
| EP | 0 647 055 A1 | 4/1995 |
| EP | 0647055 A1 | 4/1995 |
| EP | 0734144 A2 | 3/1996 |
| EP | 0837578 A | 4/1998 |
| EP | 0917336 A2 | 5/1999 |
| GB | 2311439 A | 9/1997 |
| WO | 95/27385 | 10/1995 |
| WO | 97/05749 | 2/1997 |
| WO | 98/02828 | 1/1998 |
| WO | 98/58474 | 12/1998 |
| WO | 99/65183 | 12/1999 |
| WO | 01/69453 A1 | 9/2001 |

OTHER PUBLICATIONS

Murphy et al.; "Distributed Pricing For Embedded ATM Networks"; Fundamental Role of Teletraffic in the Evolution of Telecommunicati Networks, Proceedings of the 14th International Teletraffic Congress; No. 1B; Jun. 6, 1994; pp. 1053-1063; XP000593354.

David Clark; "A Model for Cost Allocation and Pricing in the Internet"; MIT Workshop on Internet Economics; Mar. 1995; pp. 1-19; XP002102708.

Appleton, J.; "Performance Related Issues Concerning the Contract Between Network and Customer in ATM Networks"; Telecommunication Access Networks: Technology and Service Trends Proceedings of the IX International Symposium on Subscriber Loops and Services (ISSLS), Amsterdam; Apr. 22-26, 1991; No. Symp. 9, Apr. 22, 1991; pp. 182-188; XP000516590.

Nishibe et al.; "Distributed Channel Allocation in ATM Networks"; Proceedings of the Global Telecommunications Conference (GLOBECOM), Houston, Nov. 29-Dec. 2, 1993; vol. 1, Nov. 29, 1993; pp. 417-423; XP000428091.

Honig, M.L. et al., "Usage-Based Pricing of Packet Data Generated by a Heterogeneos User Population"; Inforcom '95, Fourteenth Annual Joint Conference of the IEEE Computer and Communication Societies, Apr. 1995, pp. 867-874, vol. 2.

Sietmann, "Tarifmodelle Gegen Status Auf Der Inforbahn"; Funkschau, vol. 71, No. 8, Apr. 3, 1998, pp. 28-30, XP000779238.

Murphy et al.; "Distributed Pricing for Embedded ATM Networks"; Fundamental Role of Teletraffic in the Evolution of Telecommunication Network, Proceedings of the 14$^{TH}$ International Teletraffic Congress - ITC 1, Juan-Less-Pins, Jun. 6-10, 1994, No. 1B, Jun. 6, 1994, pp. 1053-1063; XP000593354.

Clark; "A Model for Cost Allocation and Pricing in the Internet"; MIT Workshop on Internet Economics, Mar. 1995, XP002102708, http://www.press.umich.edu/jep/works/ClarkModel.html.

Appleton; "Performance Related Issues Concerning the Contract Between Network and Customer in ATM Networks"; Telecommunication Access Networks: Technology and Service Trends Proceedings of the IX International Symposium on Subscriber Loops and Services (ISSLS). Amsterdam, Apr. 22-26, 1991, No. Symp. 9, pp. 182-188, XP000516590.

Nishibe et al.; "Distributed Channel Allocation in ATM Networks"; Proceedings of the Global Telecommunications Conference (Globecom), Houston, Nov. 29 - Dec. 2, 1993, vol. 1, Nov. 29, 1993, pp. 417-423, XP000428091.

Sloman et al.; "Domain Management and Accounting in an International Cellular Network"; BNSDOCID: <XP 199363A, 4/93, pp. 193-204.

Kaltenmorgen, Kleinewillinghofer-Kopp: "Verkehrskontrolle in ATM-Netzen"; Der Fernmelde Ingenieur, vol. 46, No. 1, Jan. 1992, pp. 1-33, XP000407119.

Estrin et al.; "Design Considerations for Usage Accounting and Feedback in Internetworks"; Computer Communications Review, vol. 20, No. 5, Oct. 1, 1990, pp. 56-66, XP000167877.

Mackie-Mason et al; "Pricing Congestible Network Resouces"; IEEE Journal on Selected Areas in Communications, vol. 13, No. 7, Sep. 1, 1995, pp. 1141-1149, XP000577206.

Murphy et al.; "Feedback and Efficiency in ATM Networks"; 1996 IEEE International Conference on Communications ( ICC), Converging Technologies for Tomorrow's Applications, Dallas, Jun. 23-27, 1996, vol. 2, pp. 1045-1049, XP000625931, Institute of Electrical & Electronics Engineers.

Hidano; "A Practical and Economical Approach to Resource Allocation"; 1997 IEEE 47$^{TH}$ Vehicular Technology Conference, Phoenix, May 4-7, 1997, vol. 3, No. Conf. 47, Nov. 18, 1996, pp. 1107-1113, XP000741599.

Johnson, Johna Till; "Cisco Serves Up a Wealth of Functions"; Data Communications; May 21, 1992; 21; 8; ABI/Inform Global; pp. 41-42.

Hannington, Stephen; "Price Cuts and New Lines to Catch the Customers"; The Times; London (UK); Nov. 17, 1997; pp. 1-3.

Anonymous; "Lucent Delivers High-Capacity Optical Networking Equipment to Increase Bandwidth on NTT's Network"; Fiber Optics Weekly Update; Boston; Jun. 5, 1998, vol. 18; Issue 23, pp. 6; 2 pages.

Lim, Wendy; "Call to Operators on Roaming Services"; [Shipping Times Edition]; Business Times; Kuala Lumpur; Jun. 5, 1998; pp. 1; 2 pages.

Bowman, C. Douglas; "Innovative Rates: Four Customers, Four Solutions"; Jan. 15, 1996; Public Utilities Fortnightly; v134n2; pp. 25-29.

Ruth et al.; "Usage-Based Cost Recovery In Internetworks"; Business Communications Review, US, Hinsdale, IL. vol. 22, No. 7, Jul. 1, 1992, pp. 38-42; XP000577637.

* cited by examiner

| BTInternet Internet Accounting Control Platform | _ □ x |
|---|---|
| Local Platform ID | BTInternet |
| Local Meter ID | local |
| Local Reporting Rate | 1000 |

Reporting Source [          ]  [ Add ] [ Remove ]

| Demon | Report NOW! |
| MCI | Required Reporting Rate |
| BTInternet | 2000 |
| | Reporting Phase |
| | [          ] |
| | ☐ Reporting priced data |
| | Security |
| | ☐ Encryption required |
| | ☐ Digital signing Required |
| | Update |

COMMUNICATIONS NETWORK

CROSS-REFERENCE TO RELATED APPLICATION(S)

This application is a divisional of application Ser. No. 09/674,717, filed Nov. 6, 2000 now U.S. Pat. No. 7,319,673, which is a U.S. national stage filing of international application no. PCT/GB99/01765 filed 4 Jun. 1999. This application also claims the benefit of priority based on the following applications: (GB) 9812161.9 filed 5 Jun. 1998, (EP) 98309609.0 filed 24 Nov. 1998, (GB) 9825723.1 filed 24 Nov. 1998, (GB)9902052.1 filed 29 Jan. 1999 and (GB) 9902648.6 filed 5 Feb. 1999. The entire contents of each of the above-identified applications is hereby incorporated by reference in this application.

BACKGROUND

1. Technical Field

The present invention relates to a communications network, and in particular to charging mechanisms in such a network.

2. Description of Related Art

In conventional communications networks, such as national PSTNs (public switched telephone networks), a significant proportion of the network resources are devoted to metering and billing network usage. Studies have estimated these resources as consuming as much as 6% of the operational costs of a telecommunications company. The Internet, by contrast, does not in general incorporate metering and billing mechanisms for individual customers. The absence of the network infrastructure required to support metering and billing reduces the operational costs of the Internet compared to conventional telephony networks, and has facilitated the rapid expansion of the Internet. However the absence of appropriate billing mechanisms has significant disadvantages in terms of the characteristics of the traffic carried by the internet: it encourages profligate use of network resources, and diminishes the incentive for investment in network infrastructure to support new applications requiring, e.g., guaranteed quality of service (QoS).

SUMMARY OF EXEMPLARY EMBODIMENTS

According to a first aspect of the present invention, there is provided a method of operating a communications network including distributing a tariff via a communications network to a multiplicity of customer terminals connected to the communications network, and calculating, using the said tariff, a charge for use by the customer terminal of the network to which the tariff applies.

Reference to a terminal "connected to the network" is used here in the description and the claims to encompasses terminals, such as mobile wireless data terminals, which log on to a network temporarily, and other terminals which have a wireless connection to the network, as well as terminals which are permanently connected to a network by a fixed line. For example, a mobile terminal may log on to a network to receive the tariff and subsequently calculate the charge while off-line, and such an arrangement falls within the scope of this aspect of the invention.

According to a further aspect of the present invention, there is provided a method of operating a communications network including;

distributing a tariff via the communications network to a multiplicity of customer terminals connected to the communications network, at a customer terminal measuring use by the customer terminal of network resources; and calculating, using the results of the said step of measuring together with the said tariff, a charge for use by the customer terminal of the network to which the tariff applies.

These aspects of the invention provide a lightweight charging mechanism suitable for use, for example, in the Internet, or as an alternative to conventional billing mechanisms in other networks where the terminals have some data processing capabilitites. It removes the burden of metering and billing from the network infrastructure and instead distributes the tariff to the customer terminals, allowing charges to be calculated at the edge of the network. This approach offers far superior scalability by comparison with conventional approaches, and is therefore particularly suitable for use in a rapidly growing network such as the Internet.

Preferably the tariff algorithm is distributed to the multiplicity of customer terminals via the communications network to which the said tariff applies. In preferred implementations, the charging mechanism is designed to function even if some tariff messages distributed via the network are delayed or lost. Preferably the step of distributing the tariff includes steps of communicating separately a formula for calculation of network usage charges, and coefficients for use in the said formula.

The network overhead for charging is further reduced by providing users with the tariff algorithm and then updating only the relevant coefficients when the tariff changes.

Preferably the method includes measuring loading of network resources and determining a revised tariff in dependence upon the results of the said step of measuring loading.

A further significant advantage of the present invention is that it facilitates control of the use of network resources by amending the tariff to reflect the scarcity of a particular resource.

The steps of measuring loading and determining a revised tariff may be carried out automatically by a network management platform. Alternatively and preferably, an algorithm for mapping congestion to price rises is distributed in the network, and preferably is located at customer terminals. Preferably the method includes operating a plurality of different services on the communications network, communicating different tariffs for different respective services to the multiplicity of customer terminals, and selectively varying a respective tariff depending on an operational condition of the respective service.

The different services may be distinguished only by different levels of QoS, or may be different in kind. This aspect of the invention may also be used in otherwise conventional networks, for example where billing is carried out centrally and tariffs are communicated to the end user only for information.

According to a further aspect of the present invention, there is provided a method of operating a communications network comprising:

operating a plurality of different services on the network;

communicating tariffs for the different services to a multiplicity of customer terminals via a common tariff distribution mechanism;

and selectively varying a respective tariff depending on an operational condition of a respective service.

According to a further aspect of the present invention, there is provided a method of operating a communications network, including calculating for each of a multiplicity of customers, using a selected one of a plurality of different tariffs, charges for the use of network resources by a respective customer terminal attached to the network, measuring the loading of network resources, and varying one or more of the plurality of different tariffs in dependence upon the loading of the network resources, and in which different ones of the plurality of different tariffs have different respective volatilities.

This aspect provides customers with varying tariffs with different degrees of volatility. Then a customer needing greater stability can pay a premium to achieve that stability, while there still remains a band of higher volatility enabling the network operator to manage short term fluctuations in demand until longer term changes in tariff can be made.

According to a further aspect of the present invention, there is provided a method of operating a communications network in which at a point of access to the network a single blocking test only is applied to traffic entering the network.

Hitherto, a network such as the Internet has operated as a single service network. However it is now proposed that the Internet should become a multi-service network. For example, it may support multiple QoS levels for different applications, or might provide both multicast and unicast services to some but not all customers. The present inventors have recognised that, using conventional access control methods, this leads to a build up of multiple tests on access to the multi-service network to determine which service is being requested in each packet and then to check if it is a service which has been paid for by the relevant customer. This aspect of the invention overcomes this disadvantages by making a single blocking test that checks whether the customer is in a position to be punished for misuse of the network. Provided that this is the case, then the relevant packet is passed onto the network and all other appropriate checks are done in parallel, rather than blocking the packet while waiting for all the tests to be passed. If any subsequent tests are failed, for example if the packet has used a QoS level not paid for by the customer, then an appropriate punishment is imposed, for example by debiting a fine from a deposit lodged by the customer.

According to a further aspect of the present invention, there is provided a method of operating a communications network comprising:

a) communicating tariff data to a user terminal connected to the network;

b) calculating at the user terminal using the tariff data a charge for traffic communicated between the network and the terminal and making a payment;

c) sampling part only of the traffic communicated between users and the network and for the sampled traffic comparing any payments made by users and the payment due according to the tariff.

According to a further aspect of the present invention, there is provided a method of operating a communications network comprising a) at a customer terminal measuring network usage;

b) communicating network usage data from the customer terminal to the network operator; and c) the network operator sampling part only of the traffic communicated between a customer terminal and the network and for the sampled traffic comparing the network usage with the network usage data from the customer terminal and thereby detecting any discrepancy.

This aspect of the invention may advantageously be used in conjunction with one or more of the preceding aspects, but may also be used independently of them. For example, the customer terminal may measure usage data, and may send this data to the network operator, without having access to the current tariff. The network operator might then apply the relevant tariff and bill the user based on the user's own data. In order to be assured that the network usage data is trustworthy, the data can be compared with the expected usage data based on the network operator's own measurements in a sampled period. If the data are identical, then the data for other periods is assumed to be trustworthy. Alternatively, the tariff may be provided to the customer terminals and then, rather than the usage data being communciated explicitly, the customer calculates the usage charge. The payment of the usage charge, or equivalent accounting information is then communicated to the network operator, and the measured usage data is implicitly present in this communication.

According to another aspect of the invention, there is provided a method of operating a communications network, including automatically varying, depending on network loading as detected at a customer terminal, a tariff for network usage by a customer terminal. This aspect may be used in conjunction with, or independently of the other aspects of the invention.

Other aspects of the invention are as described and claimed below. The invention also encompasses communication networks, management platforms, routers and customer terminals adapted to operate in accordance with the methods of the invention, and computer-readable storage media bearing programs for implementing the invention in one or more of its different aspects.

DESCRIPTION OF DRAWINGS

Systems embodying the present invention will now be described in further detail, by way of example only, with reference to the accompanying drawings, in which.

DETAILED DESCRIPTION OF EXEMPLARY EMBODIMENTS

Figure 1:
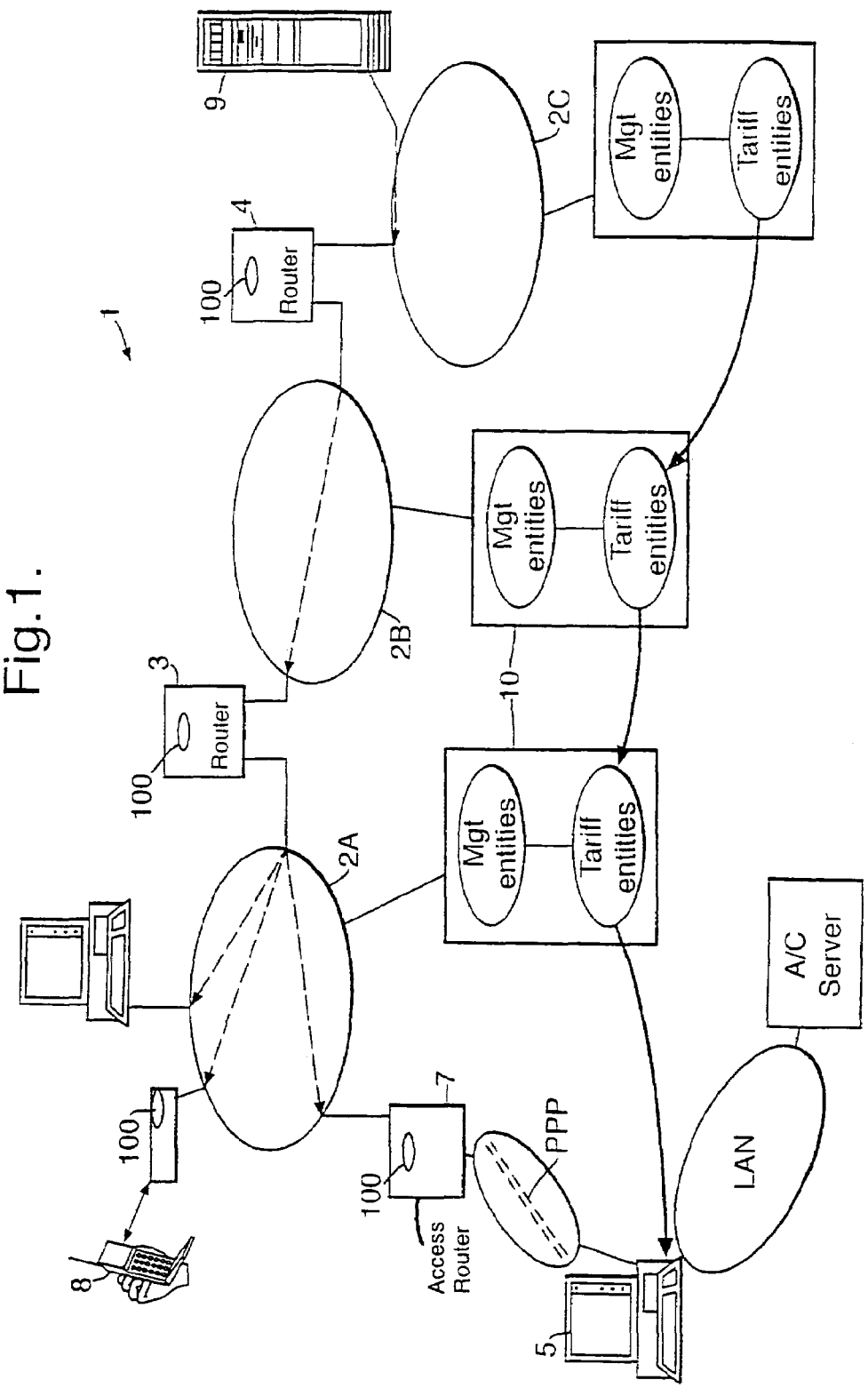
FIG. 1 is a schematic showing a network embodying the invention.

Systems embodying the present invention will now be described in further detail, by way of example only, with reference to the accompanying drawings, in which:

As shown in FIG. 1, a communications network 1 includes a number of network sub-domains 2A-C. The network sub-domains may be under the control of different operators who may not trust each other. The network subdomains are interconnected by gateway routers 3, 4. In the present example the communications network is the Internet and supports both unicast and multicast Internet Protocol (IP) and associated protocols. A customer terminal 5 is connected via a public switched telephony network (PSTN) 6 and an access router 7 to a subdomain 2A. A single blocking test is applied to traffic at this point of access. The gateway routers 3,4, and access router 7 may be commercially available devices such as CISCO series 7500 routers and CISCO series AS5800 universal access server respectively. Other customer terminals are connected to the network, including a Java-enabled mobile terminal 8 and a data server 9. The customer terminal 5 may be connected via a LAN to an accounting server. The accounting server may include an accounting object as described below that receives measurement data from the customer terminal.

In addition to the local tariff variation mechanism that is described below, the network also uses network-based control of a number of tariff bands. A network management platform 10 is connected to each subdomain. Each network management platform may comprise, for example, a computing system comprising a SPARC workstation running UNIX (Solaris) together with network management applications. The network management platform 10 hosts management entities and tariff entities. The network management platform communicates with agents 100 in managed devices connected to the respective subdomain, for example using SNMP (simple network management protocol). The management platforms monitors the overall loading of network resources in the respective subdomains, and, as will be further described below, adjust the tariffs for network use accordingly. The Net management platform (NMP) instructs the agent to monitor the device and report aggregated results at regular intervals back to the NMP, so the NMP can monitor the combination of all reports.

Tariff data is communicated to peer tariff entities in other subdomains and also to the customer terminals. The tariff data is multicast using, for example Distance Vector Multicast Routing Protocol (DVMRP) or Protocol Independent Multicast (PIM) dense mode. The tariff data channels are announced and monitored using protocols based on SDP (Session Description Protocol), SAP (Session Announcement Protocol) Charging is carried out on a "pay and display" model. Each customer terminal monitors its own network usage, for example by counting the number of packets it sends or receives across the network interface and the quantity of data (in bytes) in those packets. It calculates, using a tariff received via the network, the payment due to the network operator, and makes a corresponding payment into an account at the network operator. The network operator polices the use made by customers of the terminal by intermittently sampling traffic to or from a particular customer and comparing the use made and the use paid for.

The tariffs supplied to the customer terminals are divided into bands of different volatilities. The tariffs are varied under the control of the network operators to reflect the overall loading of the network. That is to say, if network loading becomes high, then the tariffs may be increased to reflect the scarcity of network resources.

A service provider may offer different products defined by different service level agreements, and/or by different price volatilities. For example product A might offer best-effort service at a fixed price while another product B might offer best-effort service at a variable price. A service provider may adjust product prices on the basis of the following parameters: the price the service provider pays to its wholesale provider: competitors' prices; current resource utilisation; relevant demand for different products. In response to changes in these parameters, tariff adjustments may be effected in one of three ways. Firstly, a tariff may adjust prices on the basis of local observations of network loading, without necessitating explicit communication from the provider. This approach, which is described in further detail below, needs to be built into the tariff at the outset, and is limited to those price variations which are dependent exclusively on local observations. Secondly, the provider may tune a tariff by adjusting some of its parameters. This kind of adjustment is required when the decision is dependent on parameters which cannot be observed directly by the customer, e.g., variation in the wholesale price of network resources. Thirdly, the provider may completely replace a tariff. This is required when the existing tariff cannot accommodate the changes that are required.

The first of the tariff changes described above is necessarily carried out automatically. The second type of change may be performed manually, or by an agent that issues adjustments automatically in response to observations made by the service provider system. The third type of change is likely to be performed manually, as replacement of a new tariff will in general require an element of design requiring human input. However, it is possible that an agent might be employed to automatically switch tariffs for a product on the basis of a set of specified rules.

This section described a prototype that we implemented to demonstrate the tariff subsystem outlined above. Features of the design include:

using mobile code to represent tariffs and associated user interface components;

use of a repeated multicast announcement protocol to communicate tariffs and tariff adjustments efficiently;

using dynamic class loading and reflection in order to receive and tune tariffs.

The prototype consists of a library of general-purpose Java classes and two specific applications, namely:

a provider system which allows the provider to introduce, replace, and tune tariffs for a number of products;

a customer system that enables customer to keep track of the charges being applied for the products they are using.

The provider system services multiple instances of the customer system running on different hosts in a multicast-enabled network. A multicast announcement protocol is used to communicate tariff changes from the provider system to customer systems.

In order to maximise flexibility with respect to the definition of tariffs, we chose to represent tariffs using Java classes. This technique is also used to supply user interface components to customers to support visualisation of the behaviour of a tariff.

The Tariff interface acts as the base class for all tariffs. This defines a single operation get GUI ( ) which returns as a Java SWING component that can be incorporated into the customer's GUI (graphical user interface). This GUI component enables the customer to visualise the behaviour of the tariff using techniques appropriate to the tariff.

Subclasses of the Tarrif interface establish a set of tariff types, each of which is associated with a different set of measurement and input parameters. These parameters are identified by listing them in the signature of the getCharge ( ) method. For example, the interface RSVPTariff defines get-Charge ( ) as receiving n RSVP TSPEC, allowing for the definition of tariffs that compute price on the basis of the characteristics of an RSVP reservation BLB98. On the other hand, the interface PacketCountTariff defines getCharge ( ) as receiving measurements of packets in, packets out, and current congestion (typically measured as a function of packet drop), allowing for the definition of tariffs that are dependent on packet counts and sensitive to congestion. Other tariffs may be added as new forms of usage-measurement emerge.

Tariffs are defined by providing implementations of the various tariff interfaces described above. For example, the tariff PacketCountLinear implements PacketCountTariff to compute charges in proportion to packet counts. Another tariff CongestionSensitiveLinear works on a similar basis, but adds a penalty charge if the customer does not stay within a specified traffic limit in the presence of congestion.

In addition to the tariff interface implementation, a tariff may make use of other 'helper' classes to assist in its operation, as well as one or more user interface component classes for customer visualisation purposes. A provider-side user interface may also be required in order to enable the provider to make tariff adjustments.

A complete tariff description consists of a set of Java classes, some of which are destined for the customer system and others which are intended for use by the provider system[3]. The customer-side classes are bundled into a Java archive (JAR) file to facilitate processing by the provider system.

In order to deploy a new tariff, the provider system first loads the tariff classes which it requires into its execution environment. It then loads the customer-side bundle, serialises it, signs it with a private key, and uses an announcement protocol to distribute it to customer systems. The use of a signature makes it possible for customers to verify that received tariffs are authentic.

Upon receiving the bundle, each customer system verifies the signature (using the public key matching the provider's private key), and at the activation time specified in the announcement protocol header which may be significantly later, e.g. hours or days, unpacks the bundle, and loads the classes into its execution environment using a purpose-built dynamic class loader. An instance of the received tariff class is created and installed in place of the previous tariff. If the tariff has a user interface component (obtained by calling the tariff object's getGUI ( ) method), then it replaces the user interface of the previous tariff. The change in user interface services to notify the user that the tariff has changed.

Tariff adjustment involves the remote invocation of an operation which is specific to the tariff currently in force. This means that a customer system cannot know the signature of this operation in advance of receiving the tariff i.e. the operation will not be listed in any of the tariff interfaces known to the customer system.

In order to get around this problem, use is made of the "reflection" feature supported by Java. In order to disseminate a tariff adjustment, the provider creates an instance of an Invocation object, which stores the name of the operation to be called, together with the parameters that are to be supplied to it. This object is then serialised, signed, and announced using the announcement protocol. When an adjustment is receive and verified by a customer system, the Invocation object is de-serialised and applied to the current tariff by using reflection to invoke the described operation.

In order to simplify the announcement protocol, adjustments are required to be idempotent and complete. Idempotency guarantees that a tariff will not be adversely affected if an adjustment is applied more than once. Completeness implies that an adjustment determines the entire parameter set of a tariff object, so that an adjustment completely removed the effects of any previously applied adjustments.

The customer system may apply a tariff by repeatedly invoking the getCharge( ) operation supported by that tariff every second, and adding the returned value to the cumulative charge. The parameters supplied to getCharge ( ) depend on the kind of tariff currently in force. For example, if the tariff is an implementation of PacketCountTariff, then measurements of inbound packets, outbound packets and congestion over the past second are required. However, if the tariff is an implementation of RsvpTariff, then only a TSPEC describing the current reservation is required[4]. This implies that a customer system can only subscribe to a product if it can supply the parameters require by the tariff associated with hat product.

Each invocation of the getCharge ( ) method also results in an update to the tariff-specific user interface. For example, in the CongestionSensitiveLinear tariff, the usage parameters supplied to getCharge ( ) are used to update the graphical displays of traffic and congestion.

The announcement protocol is used to communicate serialised tariffs and adjustments from a provider system to multiple customer systems. The number of customer systems is assumed to be large, and a repeated multicast solution is adopted.

Each product supported by a provider is assigned a multicast channel for announcement purposes. Customer systems listen to the channels corresponding to the products that they are using. In the current implementation, it is assumed that each customer system has knowledge of well-known multicast addresses for the products it is interested in.

For each product channel, the provider repeatedly announces the current tariff and the most recent adjustment made to it (if any). Each announcement carries a version number, which is incremented each time the announcement is changed. Customer systems only process announcements when a version number change is detected. If a new customer joins a channel, it waits until it receives a tariff before processing any adjustment announcements. Furthermore, an adjustment is only applied if its announcement version is greater than that of the current tariff, thereby ensuring that a missed tariff announcement does not result in the application of a subsequent adjustment to an old tariff.

While centralised monitoring and control of tariffs by the network management platform is effective to respond to global changes in the loading of the network, it is difficult to handle localised congestion in this way. It is difficult to cause a price rise signal to be multicast in such a way that the signal is only received by those attempting to communicate packets through the point of congestion. This would require a separate multicast transmission for each element in the Internet, e.g. a multicast for every different queue on every interface of every router. Alternatively some aggregation of price rises triggered by local resource loading might be used. This however would mean that price rise signals were sent to users who were not making use of the congested resource. This in turn would make it necessary for the price rise signal to be damped, reducing the ability of the price rise to reduce the demand on the congested resource.

To overcome these difficulties, the tariff algorithms installed on the customer terminals are arranged to respond automatically to congestion in a network resource being used by the terminal. Each algorithm includes a function which varies the price for network usage in dependence upon the detected congestion level. This function may be integrated in the main tariff algorithm, or, as in the example described here may be a separate algorithm used to calculate a premium to be added to a price calculated in accordance with the main tariff algorithm.

The main tariff algorithm calculates a price P as a function of a number of quality parameters, $Q_1$, $Q_2$, $Q_3$ where, for example, $Q_1$ is a specified latency for packets communicated across the interface between the customer terminal and the network, $Q_2$ is the reserved bandwidth for the transmission, $Q_3$ is a specified level of reliability corresponding to a maximum permissible level of packet loss.

The price P is then given by:

$$P=f(Q_1, Q_2, Q_3 \ldots)$$

Figure 2A:
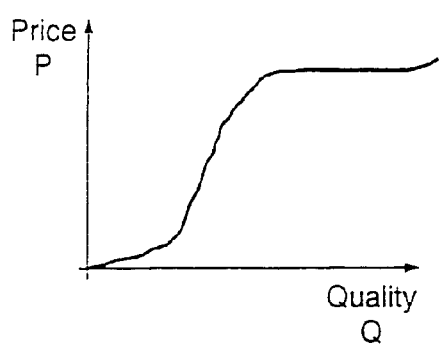
FIGS. 2a and 2b are graphs showing tariff functions.

An example of the pricing function in terms of one of the quality parameters Q is shown schematically in FIG. 2a.

The congestion tariff algorithm calculates a premium $\Delta P$ which is a function of one or more congestion parameters C:

$$\Delta P=f(C_1, C_2 \ldots)$$

Figure 2B:
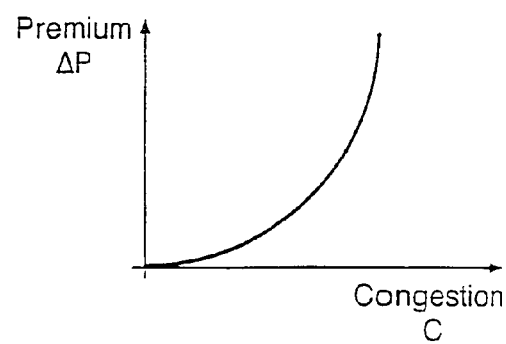

The congestion parameters provide a measure of the loading of the resources which a customer terminal is making use of at any given time. In the present example the ratio of packets lost to packets received is used as the congestion parameter. This parameter is readily calculated, for example in the case of packets using TCP (transport control protocol), or RTP (real time protocol) over UDP (user datagram protocol), since such packets include a sequence number. FIG. 2b shows one example of the function for generating the premium. In this case, the premium increases as an approximately exponential function of the congestion, so that at low congestion levels a small premium is charged, while if congestion increases still further, then at higher levels of congestion the premium increases sharply.

In an alternative implementation, an explicit congestion signal is added by any congested router within the network to packets transmitted to the customer terminal.

Although only a single main tariff and premium are described here, in practice different subdomains, and different service providers associated with each subdomain, may each have a different pricing structure, with different main and premium tariffs. However, there is across all the subdomains a common relationship between network loading levels and congestion signalling.

The operation of this second implementation will now be described in the context of a network operating using a differentiated service as described in the Internet Engineering Task Force draft "Differentiated Services Operational Model and Definitions" and in the paper by David D Clark (MIT), "A Model for Cost Allocation and Pricing in the Internet", presented at MIT Workshop on Internet Economics, March 1995, URL:http://www.press.umich.edu/jep/works/Clark-Model.html. In a network implementing differentiated services, nodes are arranged to discriminate between packets to provide different levels of service. This capability might be used, for example, to accord delay-sensitive data, such as data generated by an IP telephony client, a higher priority compared to other data, such as email data. At the network edge, for example at a client terminal running the IP telephony client, bits in a TOS (type of service) octet contained within each packet header are set to indicate the appropriate service level. Those bits are used by routers within the network to determine how the relevant packets should be handled.

Figure 3:
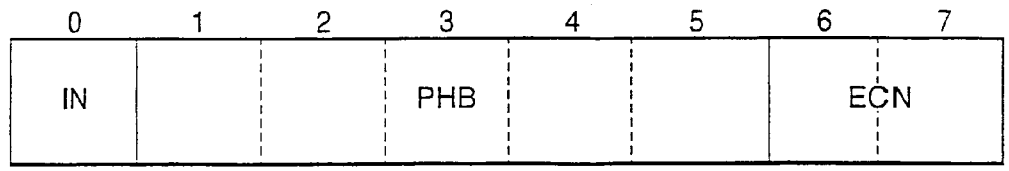
FIG. 3 shows the format of a differential service byte.

The TOS octet when used in this way is termed the DS (differential service) byte. The format of the differential service byte is shown in FIG. 3. Bit zero, labelled "IN" indicates whether the packet is inside or outside a defined profile. Bits 1 to 5 labelled "PHB" define a "per-hop-behaviour" that is they indicate how, for example, a router should handle the packet, e.g. by according it lower or higher priority. Bits 6 to 7, in this particular form of the DS byte, are used for explicit congestion notification (ECN). One of these bits is set to indicate whether the routers in the path of the packet are capable of setting the ECN field, and the other bit is used as a flag which is set (by ECN capable routers) when congestion, or loading which would potentially lead to congestion, occurs. Random Early Detection (RED) algorithms are currently implemented in routers. These algorithms measure average queue length within the packet buffers of a router. An exponential moving average is calculated. When that average queue length exceeds a predetermined threshold, then the router signals that congestion is occurring. Conventionally this signalling has been done simply by dropping a packet. However, in the context of an ECN scheme, the router, instead of dropping a packet, sets an ECN bit in a packet header to indicate that congestion is occurring. This is done probabilistically: that is, some only of the packets passing through the router are marked. The probability of a packet being marked increases with the average queue size. In the rare case that the queue increases to a length where the router buffers are full, then packets are dropped, rather than an ECN bit being set. In this case ECN bits are set for all the remaining packets.

In operation, if the client terminal 5 is accessing a data source on the server 9, congestion may occur, for example, at router 4 which links network sub-domains 2B and 2C. RED-like algorithms in the router 4 detect that the queue lengths in the router buffers, as calculated using the exponential moving average, exceed a predetermined threshold. Accordingly some of the packets from the server 9 en route to the client terminal have the ECN bit of the DS byte set by the router 9 to mark the fact that congestion is occurring. At the client terminal, the DS byte in the headers of incoming packets is read. A moving average of the number of packets containing an ECN bit which is marked is calculated. This average then provides the congestion parameter $C_1$ which is used to calculate the premium:

$$\Delta P=f(C_1).$$

The total price to the user $P_{TOT}$ is then calculated by adding together the prices determined by main tariff algorithm and by the premium algorithm:

$$P_{TOT}=P+\Delta P.$$

This total price is passed to a cost decision agent running on the client terminal. This cost decision agent is programmed with user defined rules. These might state, for example, that the cost decision agent should authorise the system to proceed with a connection as long as the total cost averaged over a certain time period falls below a predetermined threshold, e.g. of £0.01 per minute, and that the cost decision agent should suspend a connection and alert the user if the cost rises above that threshold. Alternatively, as previously noted, the cost decision agent may handle several applications simultaneously, and may be programmed to slow down one of the applications as the premium for using a data source accessed by that application increases.

For ease of description, the preceding sections have treated in isolation the local variations in tariff in response to congestion. In practice, this mechanism will in general be combined with other responses to congestion, and with other sources of variation in the tariff. Also, a decision to proceed with a transmission despite congestion will in general require the consent of parties at both ends of the transmission. Considering the entire system of the data source, network and routers and the data receiver, the implementation of an increase in tariff (also termed here a "fine") in response to locally detected congestion occurs as a last resort. Other responses are implemented first, in the following numerical order:
1. the network re-routes around congestion
2. the network borrows capacity from lower levels of service (lower in the context of the relevant dimension(s) of QoS) including the best effort service
3. the network introduces extra capacity (possibly automatically)
4. the end-system establishes that the congestion is on the shared network and not just on the access links or end systems
5. the end-system sets QoS requirements to a "higher" level (if cheaper than the fine for ignoring congestion at the current level)
6. the end-system decides it is essential to ignore the congestion, given the fine for doing so might be quite high
7. both (all) end-systems agree to ignore the congestion.

Typically, it is at step 4 that an ECN signal is generated. Steps 1 to 3 precede the generation of this signal and steps 5 to 7 follow the generation of the ECN signal.

Figure 4A:
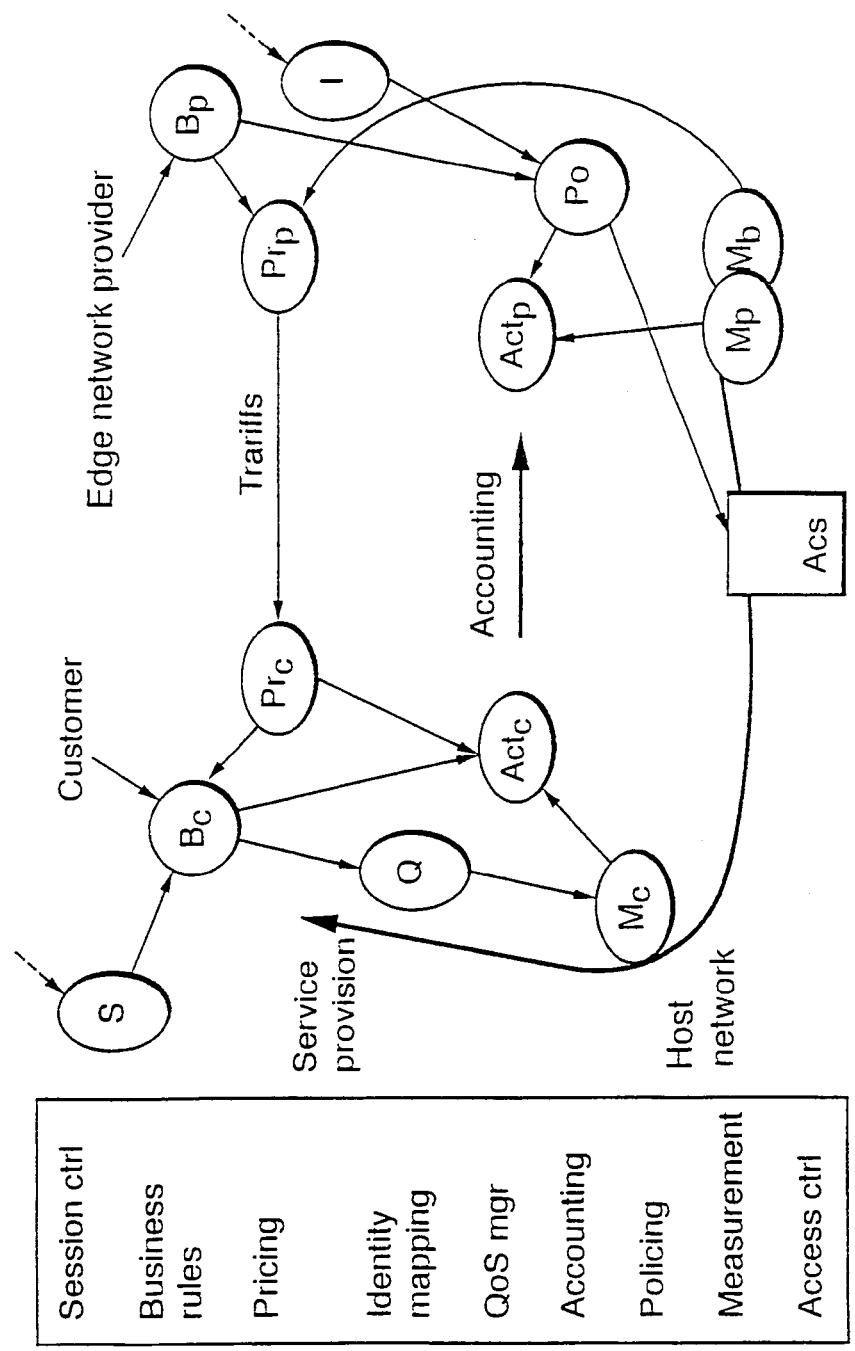
FIGS. 4a and 4b are schematics showing the component objects of a charging architecture for use with the network of FIG. 1.
Figure 4B:
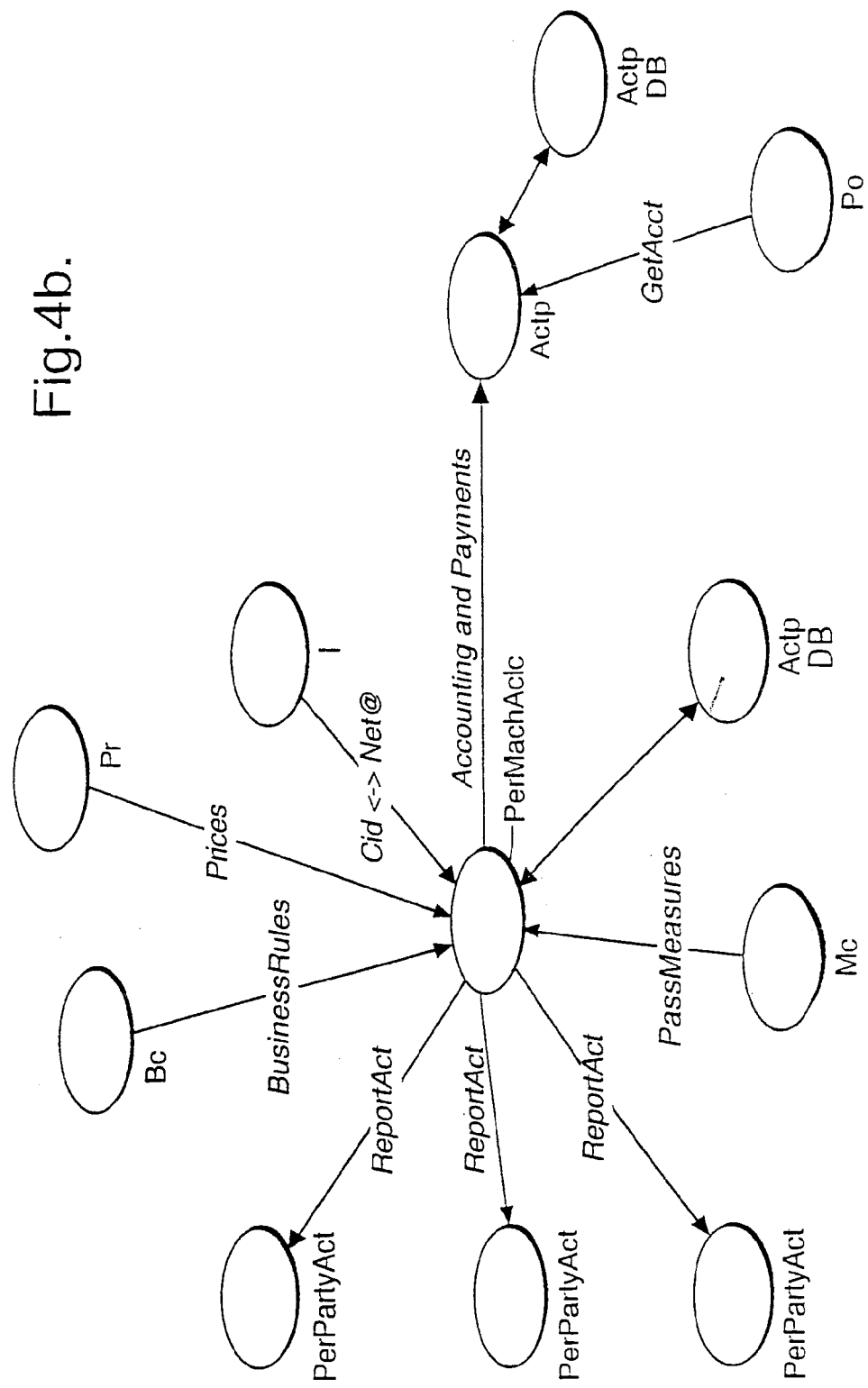

The last step prior to proceeding with a connection and paying the premium for doing so is establishing agreement by both parties. Accordingly, when the customer terminal detects congestion, either through receiving explicit congestion notification, or through detection of a relevant parameter such as packet loss, the customer terminal signals this fact back to the or each other end system. In the present example therefore, the client terminal 5 signals to the data server 9 that congestion is occurring. The data server is programmed with rules, which as at the customer may be implemented as an agent, which determine the response to such a signal. For example, the server may refuse service in these conditions. As described previously with respect to FIG. 1, in the present example tariffs are multicast through the network from network operators to the customer terminals, and charging is carried out using a "pay and display" process. FIGS. 4a and 4b shows the objects used to implement the charging architecture in this case. FIG. 4a shows the higher level objects and 4b shows the component objects used in a software implementation of the architecture of FIG. 4b. In FIG. 4a, objects on the client terminal are shown in the half of the Figure labelled "customer" and objects on the access router 7 and the corresponding network sub-domain are shown in the half of the Figure labelled "edge network". The objects on the customer terminal include a session control object S, a customer business rules object $B_c$, a customer pricing object $Pr_c$, a QoS manager Q, a customer accounting object $Act_c$ and a customer measurement object $M_c$. The business rules object $B_c$ receives information on those aspects of the session which involve liability for payment and receives current pricing data from the pricing object $Pr_c$. The customer business object makes decisions, under the customer's policy control on which chargeable services are utilised, and how much of the chargeable services are utilised. These decisions are fed to the QoS manager Q, which decides which mechanisms are used to achieve the requirements. The QoS manager then controls the customer measurement object $M_c$ to determine which aspects of traffic and service to measure and which aspects to ignore. The measurement object then records the selected aspects of the traffic, for example counting the number of packets received by the customer terminal and the QoS levels for those packets. These data together with the current tariffs, including any premium for congestion, are then used by the customer terminal to determine the charge payable to the network operator. The measurement object $M_c$ is also programmed with instructions which determine the frequency with which it passes data to the customer accounting object $Act_c$. The customer accounting object $Act_c$ passes payments to an accounting object $Act_p$ in the network provider's domain.

The accounting objects on the customer terminal may be implemented using a small encrypted flat-file database. On the network provider's side, the equivalent objects may be implemented using a larger database that is scaleable to handle e.g., tens of thousands of customer accounts. An object request broker (ORB) is used for communication between the customer-side objects and the network-side objects, implemented using commercially available tools such as ORBIX (TradeMark) from Iona Technologies pic.

On the network provider's side, that is to say within the subdomain to which the customer terminal is connected, the customer's traffic is measured by a version of M, denoted $M_p$, but only on a sampling basis determined by the policing function, Po. That is to say, the network operator samples the customer's traffic only intermittently. Po controls where in the network measurements are made in order to capture all of any particular customer's traffic. A bulk measurement function, $M_b$, is responsible for reporting aggregate traffic levels, as reflected in the moving average of the router queue lengths, to the pricing object, $Pr_p$. Bulk measurements would typically be collected from across the provider's domain to a centralised pricing function (which would be replicated for reliability). $Pr_p$ sets prices taking into account the business rules from the network provider's business object, $B_p$, as well as the current traffic levels reported by Mb and pricing from neighbouring providers (see below). The policing function, Po, compares sample measurements from $M_p$ with accounting messages received at $Act_p$ as a result of the customers own measurements. If it establishes that the accounts are insufficient it might restrict service at the access control gateway, Acs, or initiate some other punishment. Encapsulated within the accounting object another policing object checks the accounts match the payments within the contracted time for payment. Finally, the identity mapping function, I, provides a mapping between a customer's identity (account, digital signature, etc.) and their current network address (typically allocated by the ISP, whether unicast or multicast).

Figure 5A:
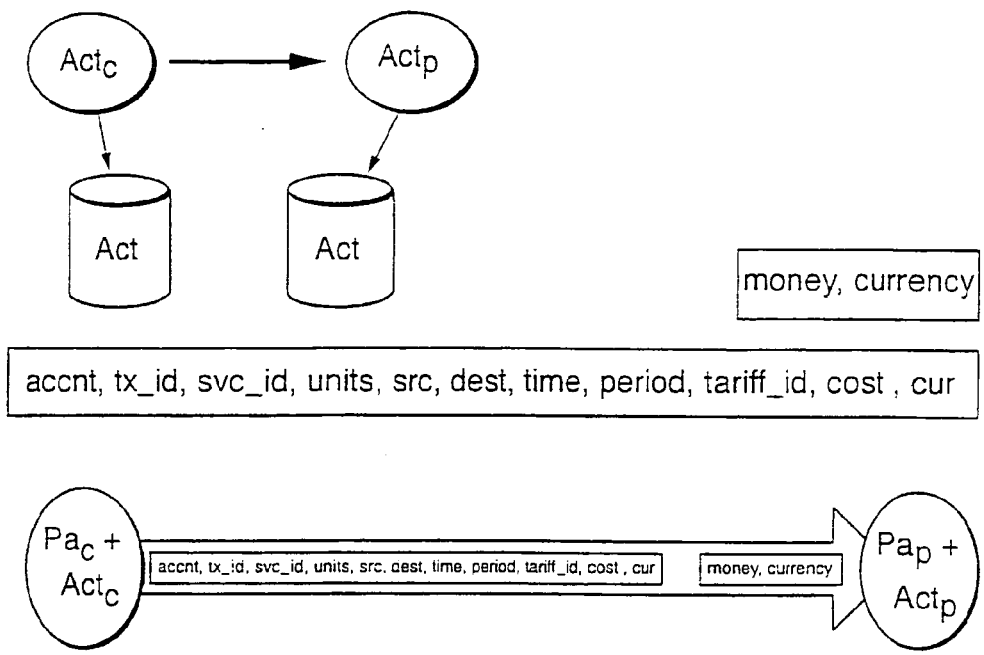
FIGS. 5a and 5b shows data passed between the accounting objects of FIG. 4.
Figure 5B:
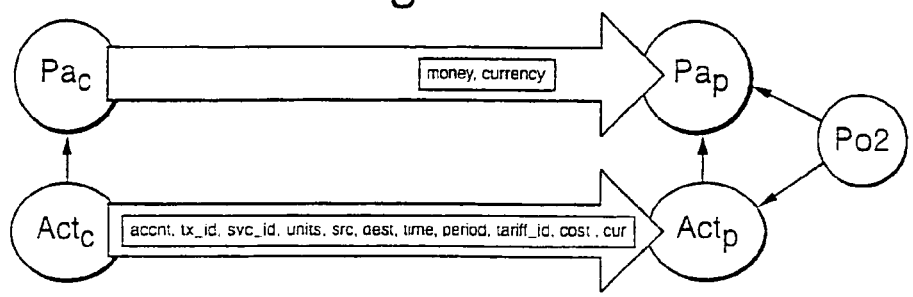

FIG. 5 shows the data which are passed between the accounting objects. In this example the account data comprises: account identity; bill record identity; service type identifier; source address; destination address; tariff identity; time; period (i.e. the period covered by the bill record); units; cost; and currency. In addition, the payment data comprises the amount of money and the currency of payment.

Figure 6:
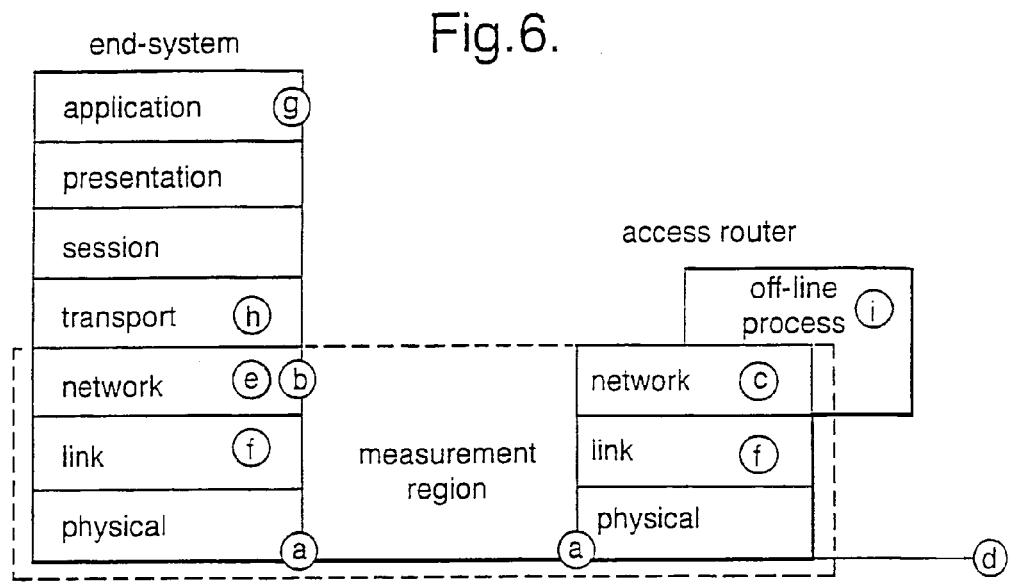
FIG. 6 is a schematic showing protocol stacks on a customer terminal and in the network domain.

FIG. 6 shows the measurement region within protocol stacks on the customer terminal and in the network domain. Ideally there would be two measurement points within this region, one trusted by the customer and one trusted by the network, for example at the two points referenced (a) in the Figure. For ease of implementation, a single measurement point (b) trusted by both parties may be used. This might be implemented, for example within a secure module such as a cryptographic card on the client terminal. As an alternative, measurements may be made at different points with some possibility of discrepancies between measurements. On the network the practical measurement point is at the first access device(s) that, for each customer, inspects network layer headers (c) (IP in this case). ISPs should not measure any deeper into their network (d) because their access network and systems will introduce delays and losses.

For an individual customer (e.g. on dial-up access), a practical point at which to measure would also be alongside the network layer but in their end-system's stack (e). Ideally these measurement points would be lower in each stack to be closer to the interface between the two parties and less likely to be affected by contention in the stack. However, measuring at the link layer (f-f) would be inappropriate because only some chargeable parameters set at the network layer will ever be reflected in link layer frames; network level multicast, end-end latency requirements etc. may never be visible at the link layer. Also, link layer headers would need to be ignored when measuring packet sizes for bandwidth calculations to avoid apparent discrepancies where different link technologies are chained together.

In the reception direction (up the stack) this choice of measurement points implies that the lower layers must be dimensioned (buffer sizes, interrupt and thread scheduling priorities) to cope with the most stringent QoS requirements of higher layers. As frames are taken off the physical media, the machine must be able to pass data up the stack without any chance that usage-charged data gets discarded (e.g. due to buffer overflow caused by interrupt contention) before it gets to the network layer. It is at the network layer where the ISP's service is to be measured and where it is most convenient for QoS requirements to control correct differential treatment of the various flows as they are passed further up the stack (on end-systems) or forwarded (on routers).

The measurement objects described above may be implemented using, with appropriate modifications, publicly available network metering software such as Nevil Brownlee's NeTraMet system. This is a software meter which conforms to the IETF internet accounting architecture described in RFC 2063 and RFC 2064. The meter builds up, using "packet sniffing", packet and byte counts for traffic flows, which are defined by their end-point addresses. Although generally, Addresses can be ethernet addresses, protocol addresses (IP, DECnet, EtherTalk, IPX or CLNS) or 'transport' addresses (IP port numbers, etc), or any combination of these, in the present implementation IP addresses only are used. The traffic flows to be observed are specified by a set of rules, which are downloaded to NeTraMet by a 'manager' program. Traffic flow data is collected via SNMP (Simple Network Management Protocol) from a 'collector' program.

Figure 7:
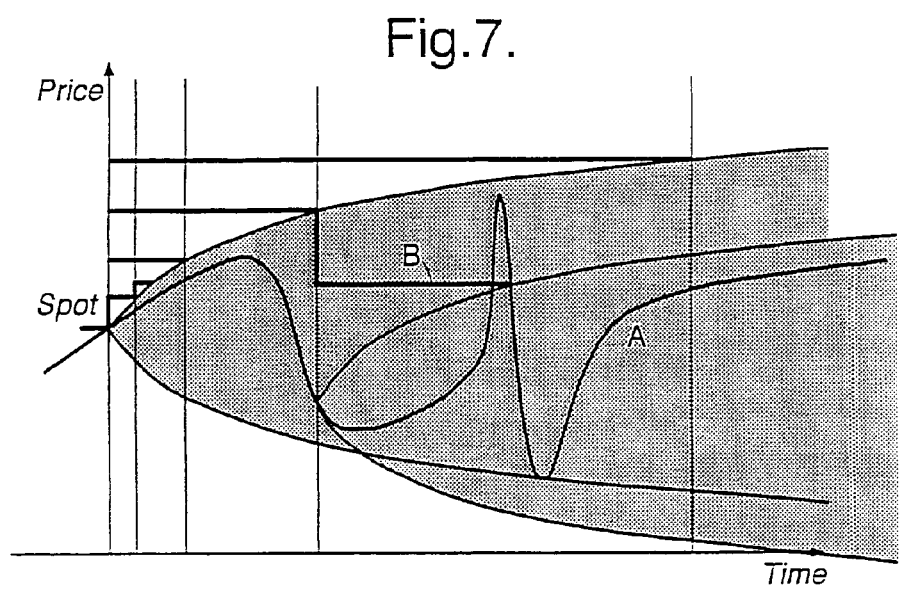
FIG. 7 is a graph showing the variation of tariff with time.
Figure 8A:
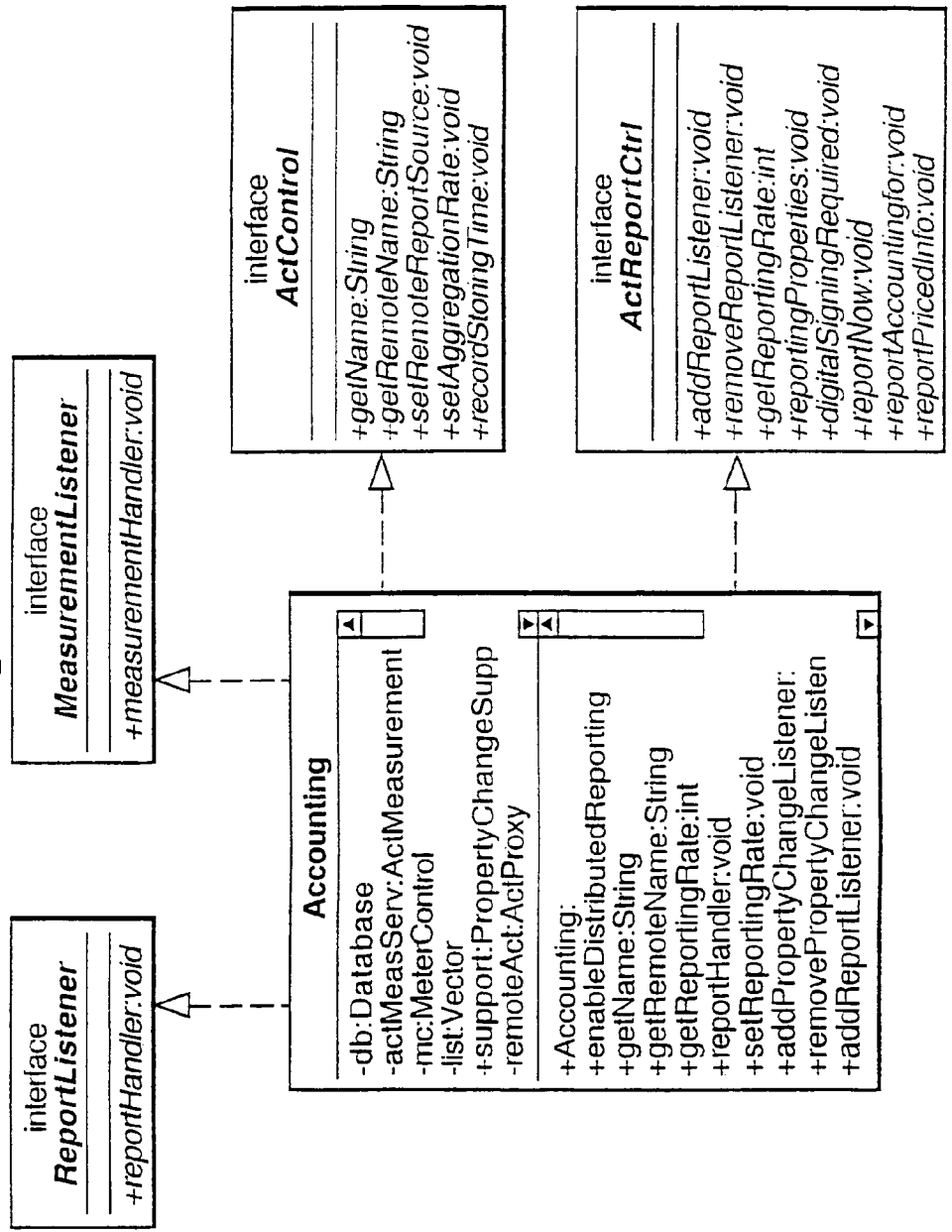
FIGS. 8a to 8e are class diagrams for software implementing accounting and measurement objects.
Figure 8B:
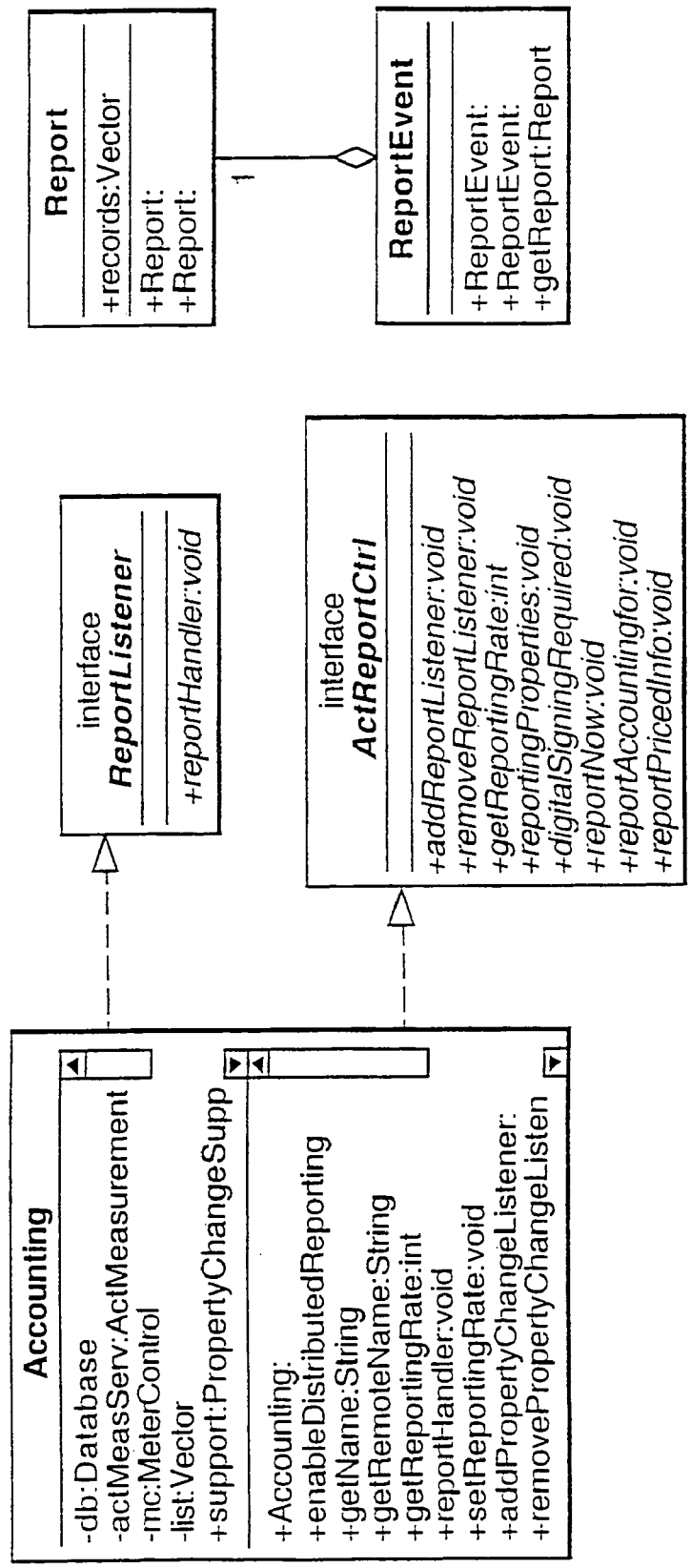
Figure 8C:
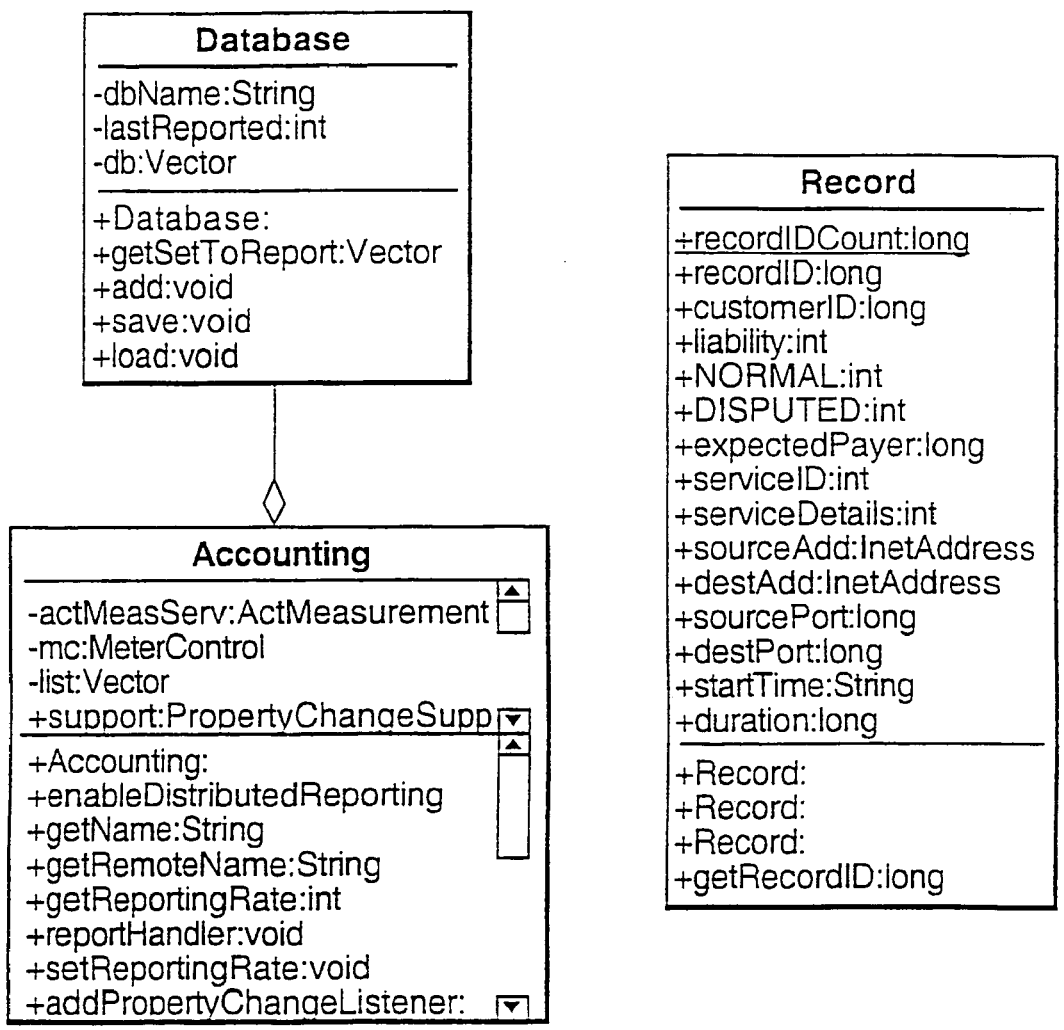
Figure 8D:
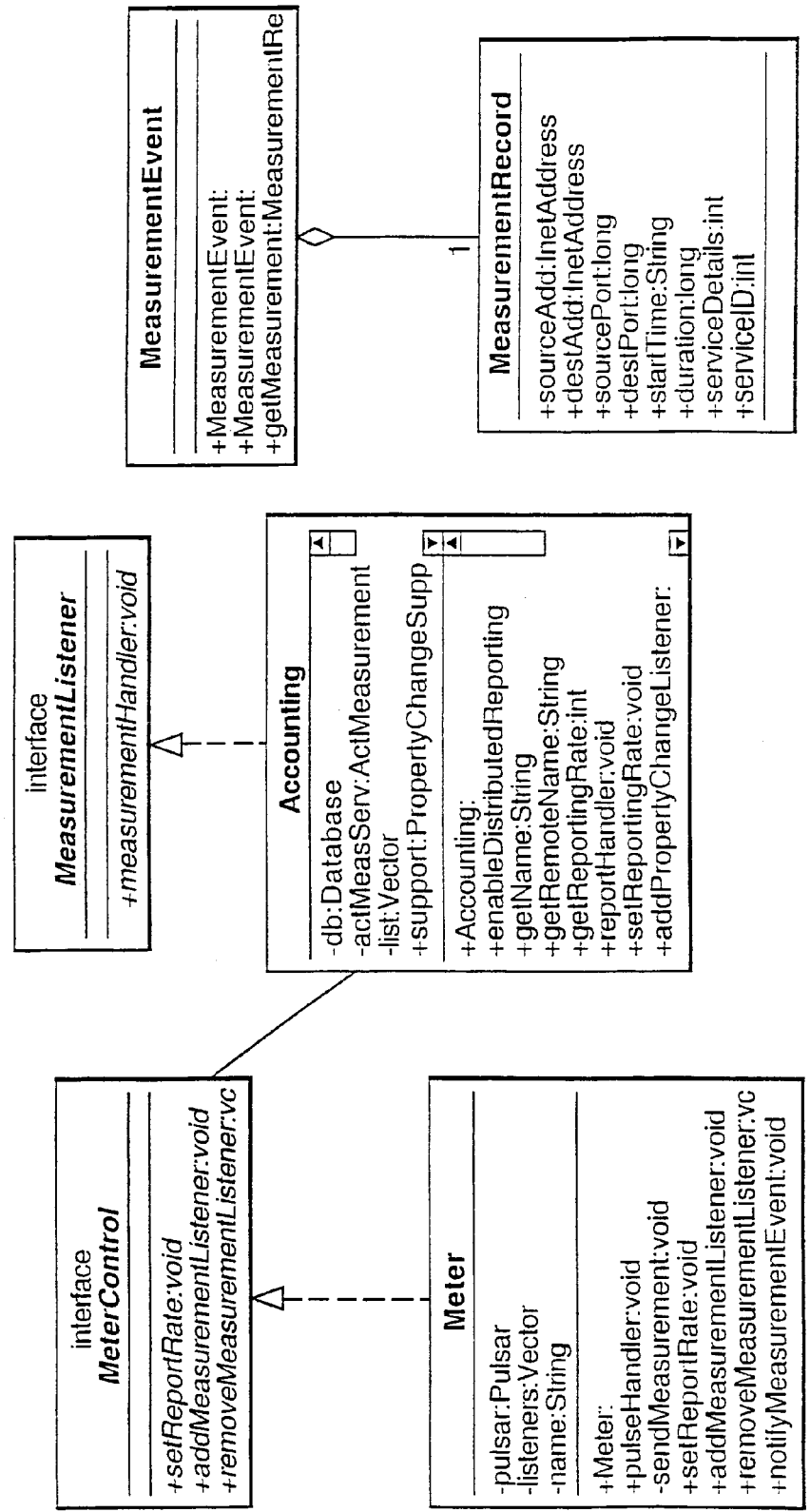
Figure 8E:
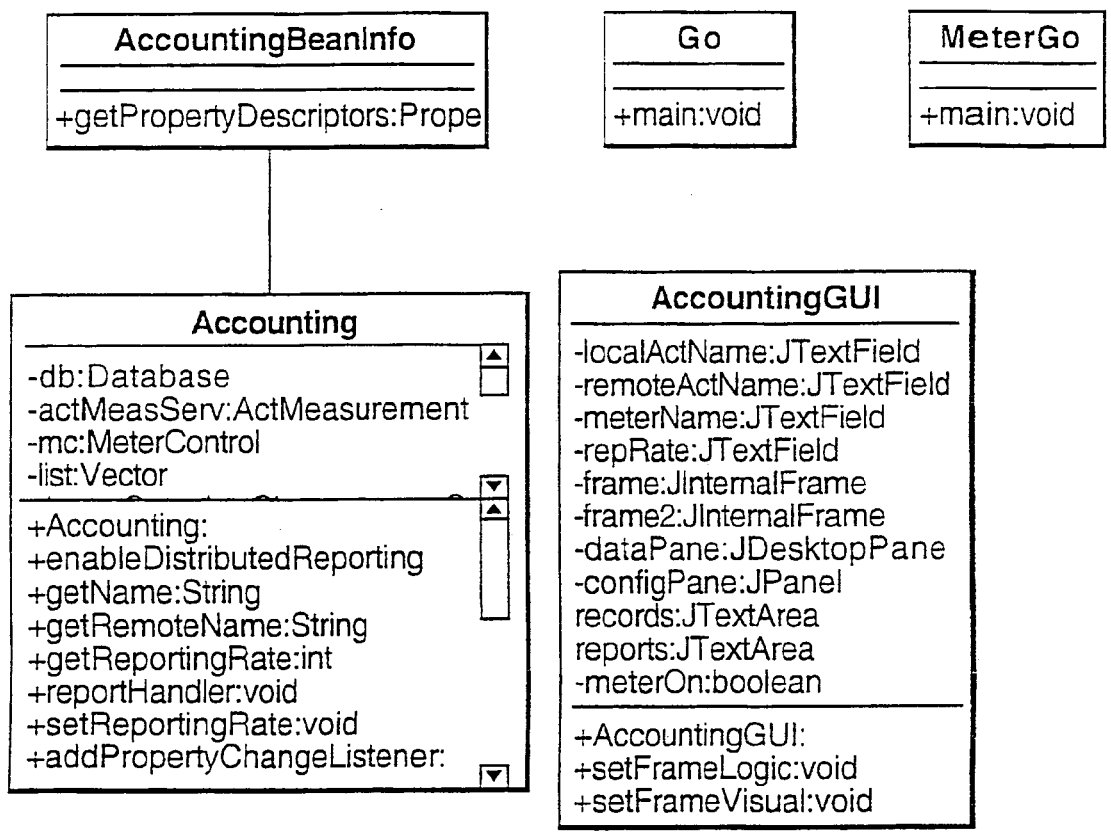
Figures 9, 10:
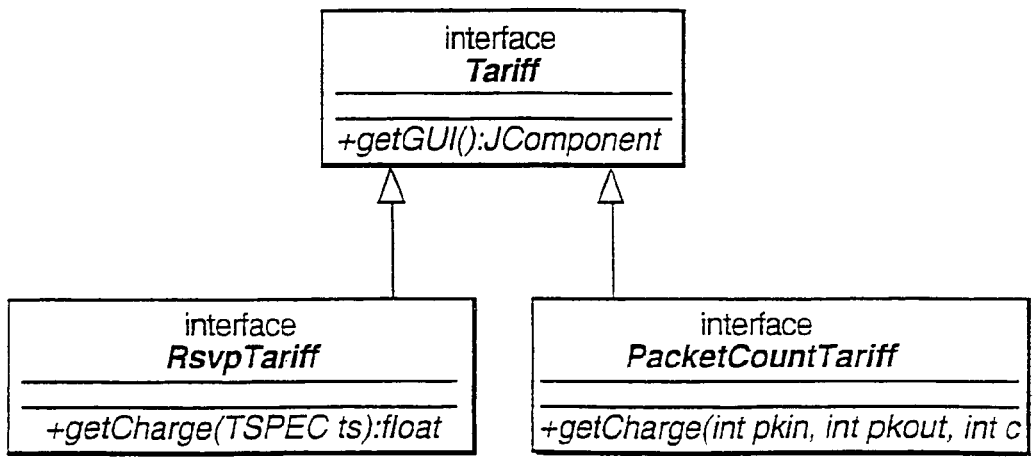
FIG. 9 is a diagram showing a graphic user interface (GUI) for use with the objects of FIGS. 8a to 8e.
FIG. 10 is a class diagram for software implementing tariff objects.

FIG. 7 shows how the main tariff determined by the network operator varies in time. In the Figure, curve A is the spot price calculated to reflect the loading of the network at any instant. Curve B is one of a number of different tariff bands. Different tariff bands have different volatilities, and the customer pays a premium for bands offering greater stability. Tariffs are communicated to the customer terminals using a hierarchy of channels carried by the network. An initial contract between a customer and a service provider a single channel address that might typically hold new announcements distributed some months apart (e.g. for contract variations or for new services specifying which second level channel to listen to for tariffs or for downloading new code to handle new tariff structures). The second level channels might deliver updates hours apart which simply announce the addresses of third level channels for the most volatile information. These third level channels may carry updates at intervals of less than a second. Prices for many services may be carried on one channel. For greatest efficiency, this one channel may be split into several channels at times of highest volatility, and re-aggregated into a single channel in more stable periods.

Instead of Charging a standard tariff for each customer based on their usage, the provider might wish to sell an individual service level agreement (SLA) to each customer. Alternatively, customers might be able to choose to accept service under one of a (possibly large) range of SLAs. Such an SLA might include obligations on the provider to provide a certain percentage service availability and other aspects of quality not directly to do with communications traffic. However, the SLA might also include a traffic conditioning agreement (TCA), such as is envisaged between providers and between providers and major customers in the proposed IETF differentiated services architecture. A TCA contains obligations on the provider's quality of service on condition that the customer's traffic is within a certain profile. Often, if traffic is outside the profile, the TCA still applies to the balance of traffic within profile. A profile might stiplate the maximum size and duration of bursts the customer should generate, or the peak rate, or the moving average rate under specified parameters. Theoretically, TCAs can also be applied to received traffic on the assumption the customer can control the rate of remote senders using rate control protocols. In the diffserv proposals, TCAs are policed by a traffic policer installed at the entrance to the provider's network. These might be specialist hardware or combined with the function of the router. Traffic policers either drop or mark any traffic outside the agreed profile which is configured into the policer. The choice of which packets to mark is random. In the diffserv proposals, the first 6 bits of the DS-byte are termed the code-point. If the last five bits of the code-point are within a certain range, the first bit of the DS byte can be used as a flag to indicate whether the packet is out of profile. Packets out of profile are still forwarded, but they take first precedence for dropping in any congested queue of any downstream router. The diffserv proposals also suggest that customers might also operate policers in series with the provider policer to mark packets that are out of profile. If done under the control of the customer's application, this enables the customer to choose which packets are marked based on their importance to the application.

In our alternative approach, we avoid the need for the provider to operate traditional traffic policers. The customer still marks their packets as suggested by diffserv proposals. However, the provider merely meters the traffic on a sampled basis. The meter checks the traffic conforms to the TCA but it operates in parallel to the data flow which can be forwarded while metering proceeds on the memory copy of the packet header in the router. If traffic is out of profile, the customer is penalised. For instance, either she is cut off, or fined or her credit rating is reduced. This is in contrast to the traditional traffic policer which 'punishes' the packets that are out of profile by marking or dropping them. In this traditional approach, the packet cannot be forwarded until it has passed the police check. If it had been forwarded, it would not be able to be marked or dropped.

The advantage of this approach is that forwarding is typically much faster than policing. For instance, if all-optical technology is used for forwarding, it is much more complex to implement policing and will therefore be unlikely to be achieved in optics for some time. With the proposed approach, samples of traffic can be tapped off the optical flow to be policed in electronics out of band. The sampling rate can be chosen to allow the traffic to fill a buffer before being passed to the policer. Thus the policer can 'catch up' with the optics between samples by emptying the buffer. This is an application of Amdahl's law concerning the maximum performance gain from a parallel process being constrained by the critical (slowest) path.

Tables 1 to 7 below list Java source code used to implement two different tariffs. The code of table 1 establishes the operations used for communication between a customer system and a tariff algorithm downloaded by the customer system. Table 2 shows a linear tariff algorithm, in which the tariff depends on the total of the packets sent and packets received by the customer together with a congestion parameter. Table 3 shows the code for generating the customer display in this case. Table 4 shows the code used to display the tariff at the network operator's server. Table 5 shows an exponential tariff algorithm. Table 6 generates the customer display and Table 7 the operator display for the exponential tariff algorithm. By downloading Java code to generate the user interface, that interface can be tailored to the requirements of the particular tariff, and can be adapted as the tariff changes.

Figure 12:
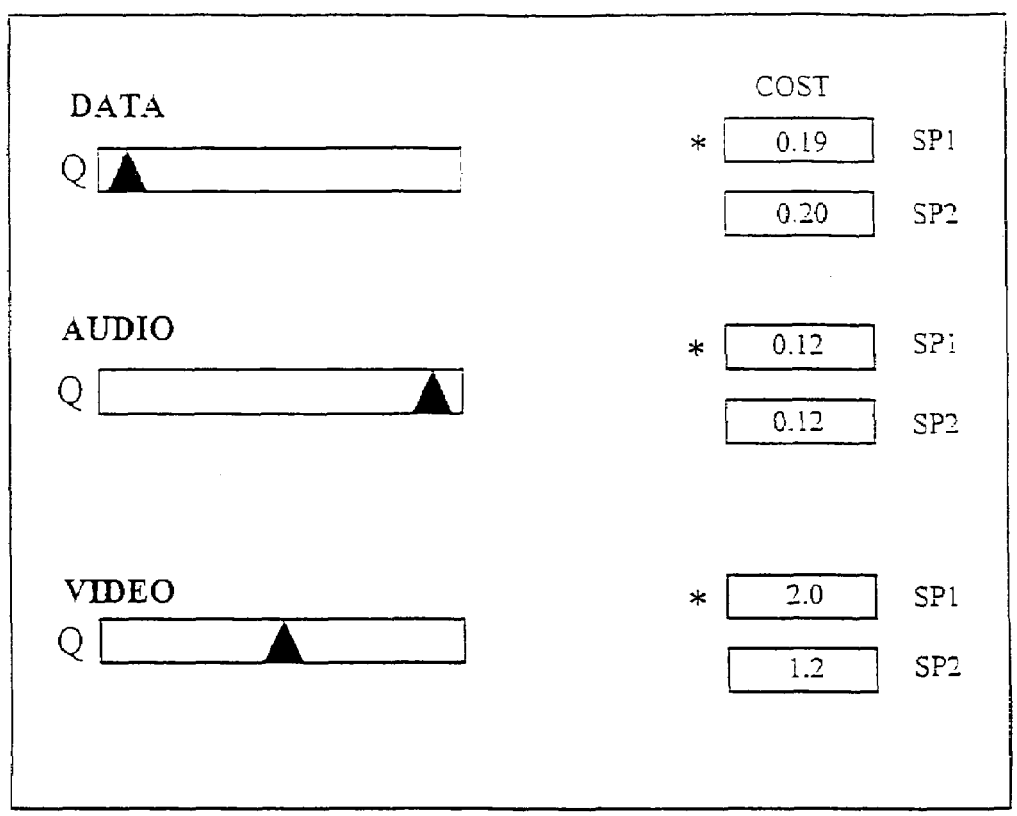
FIG. 12 shows a user interface supporting a market in tariffs.

The multicasting of tariffs may be used to support a market in network services from different service providers. FIG. 12 shows a modified user interface adopted at the customer terminal in this case. This user interface might be adopted, for example, when the customer requires a multicast audio-video conference involving data, audio and video applications. A slider control interface is used to set the required quality Q level for each of the component data streams. The underlying application then translates the Q parameter into appropriate performance parameters such as required bandwidth, packet loss and latency. The customer terminal receives multicast tariffs from two different service providers or network operators, SP1 and SP2. The user interface, in addition to displaying the cost with the currently selected service provider, SP1, also displays the cost were the other service provider, SP2 to be selected. The user may opt to switch to the second service provider SP2 for one or all of the data streams. For example, the current costs of the video data stream in the example shown in the Figure is substantially reduced by switching to the second service provider. The decision to switch may be made manually by the user, or might be automated through a software agent running on the customer terminal. In the context of network such as that illustrated in FIG. 1, the switch to a different provider may be made by dialling a different number using the customer terminal modem so that the PPP connection is made via a different access router, possibly on a different network domain. Such switching between service providers is facilitated when using a protocol such as Internet Protocol version 6 which, in a proposed implementation, offers both host and site addresses, where host addresses may remain stable even when a site IP address changes. In this case, the customer terminal would have both a host address and a site address and while the site address would change on switching service providers, the host IP address remains constant.

Figure 11:
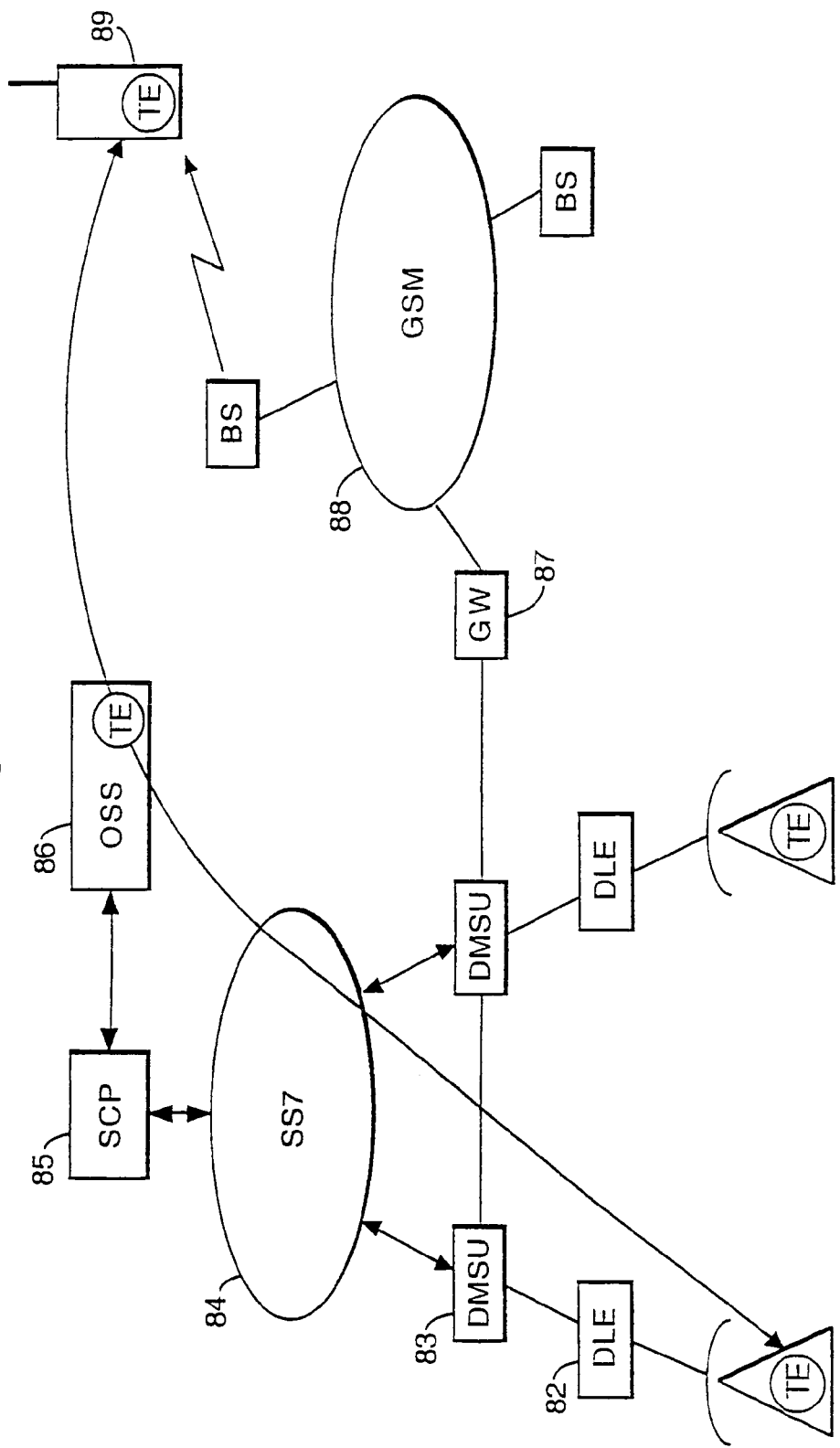
FIG. 11 is a diagram showing an alternative embodiment.

Although the examples so far described have been in the context of federated packet data networks, such as the Internet, many aspects of the invention can also be used with advantage in other types of network, such as in a circuit-switched PSTN (public switched telephony network). FIG. 11 shows an example of the invention applied in this context. In this network, customer terminals 81, which are in this example so-called intelligent phones, that is telephones incorporating a microprocessor and a data interface, are connected via local exchanges 82 and trunk exchanges 3 to the telephony networks. The trunk exchanges 83 are connected via a common channel SS7 (signalling system number 7) signalling network to a service control point 85 that is responsible for the execution of advanced call control functions. The service control point 85 is also connected to an operational support server 86 that is responsible for billing operations, and that, in this example, controls the setting of tariffs for the network. The OSS server and customer terminals include tariff entities (TE). The fixed PSTN network is also interconnected via a gateway 87 to a cellular GSM network 88. Base Stations BS in the cellular network communicate signals to intelligent mobile phones 89. In operation, network tariffs are distributed to customer terminals via the PSTN network and via the GSM network. Conveniently, the tariff may again take the form of Java functions which are executed on processors in the customer terminals. The Java functions may be streamed as Internet packets. In one implementation, these Internet packets may be distributed via the PSTN networks and GSM networks themselves. For example, the packets may be encapsulated and transported to the trunk exchanges using the MTP (message transport part) transport layer and may be communicated onwards to the customer terminals using out-of-band signalling. Alternatively, a separate data connection may be established between the OSS server and the customer terminals via the public internet. As in the examples above, the network operator monitors the loading of resources within the network and may transmit signals to the tariff entities in the customer terminals to change the tariff to reflect the scarceness or otherwise of relevant resources. Customer terminals may themselves monitor network loading and automatically generate variations in the tariffs. Usage of network resources may be measured locally by the customer terminals instead of conventional billing carried out within the network. The network operator may police the measurement of usage data by carrying out sampling, as described previously.

TABLE 1

```
// Generated by Together
package com.bt.jungle.lsma.charging.pricing;
import com.sun.java.swing.JComponent;
/**This establishes the operations used for
communication between the customer system
and the downloaded algorithm.
@author Mike Rizzo*/
public interface Tariff {
Jcomponenet getGUI( );
Float getPrice (int pkin, int pkout, int cng);
```

TABLE 2

```
package algorithms.linear;
import com.sun.java.swing.JComponent;
import com.sun.java.swing.JTextField;
import com.bt.jungle.lsma.charging.pricing.Tariff;
public class LinearAlgorithm implements Tariff {
        private float rate;
        private LinearAlgorithmDisplay display;
        public LinearAlgorithm ( ) {
                display = new LinearAlgorithmDisplay ( );
                setRate (new Float(1));
        }
        public float getPrice (int pkin, int pkout, int cng) {
                return (pkin + pkout + cng) * rate;
        }
        public JComponent getGUI( ) { return display; }
        public void setRate (Float f) {
                rate = f.floatValue( ) ;
                display.setRate (rate) ;
        }
}
```

TABLE 3

```
// Generated by Together
package algorithms.linear;
import com.sun.java.swing.JPanel;
import com.sun.java.swing.JTextField;
import com.sun.java.swing.Box;
import com.sun.java.swing.JLabel;
public class LinearAlgorithmDisplay extends Jpanel {
        private JTextField tfRate = new JTextField (4);
        public LinearAlgorithmDisplay ( ) {
```

TABLE 3-continued

```
            Box vbox = Box.createVerticalBox ( ) ;
            Box hbox = Box.createHorizontalBox ( ) ;
            hbox.add (Box.createHorizontalGlue ( )) ;
            hbox.add (new Jlabel ("Rate:"));
            hbox.add (Box.createHorizontalGlue( ));
            hbox.add (tfRate);
            tfRate.setEditable (false);
            hbox.add (Box.createHorizontalGlue( ))
            vbox.add (hbox);
            add (vbox( ));
    }
    public void setRate (float f) {
            tfRate.setText (String.valueOf (f));
    }
}
```

TABLE 4

```
// Generated by Together
package algorithms.linear;
import com.sun.java.swing.*;
import java.awt.event.*;
import com.bt.jungle.lsma.charging.pricing.provider.*;
import com.bt.jungle.util.*;
public class LinearAlgorithmGUI extends Jpanel {
        private JTextField tfRate - new JTextField ( );
        private TuningMessageListener tuningMessageListener;
        private final static String DEFAULT_RATE = "1.0";
        public LinearAlgorithmGUI (TuningMessageListener tml) {
                tuningMessageListener = tml;
                tfRate.setText (DEFAULT_RATE);
        Box vbox = Box.createVerticalBox( );
        Box hbox = Box.createHorizontalBox ( );
        hbox.add (new Jlabel ("Rate:"));
        hbox.add (Box.createHorizontalGlue( ));
        hbox.add (tfRate);
        hbox.add (Box.createHorizontalGlue( ));
        hbox.add (hbox);
        JButton bTransmit = new JButton ("Transmit");
        bTransmit.addActionListener (
                new ActionListener ( ) {
                        public void actionPerformed (ActionEvent e) {
                                transmit ( ) ;
                        }
                }
        );
        hbox = Box.createHorizontalBox( );
        hbox.add. (Box.createHorizontalGlue( ));
        hbox.add (bTransmit);
        hbox.add (Box.createHorizontalGlue( ));
        vbox.add (hbox);
        add (vbox);
    }
    void transmit ( ) {
            try {
                    Float f = new Float (tfRate.getText( ));
                    Object args [ ] = new Object [1];
                    Args [0] = f;
                    TuningMessageListener.notify(
                    new Invocation ("SetRate", args)
                );
            }
            catch (Exception e) {
                    e.printStackTrace ( );
            }
    }
}
```

TABLE 5

```
package algorithms.exp;
import com.sun.java.swing.JComponent;
import com.sun.java.swing.JTextField;
import com.sun.java.lsma.charging.pricing.Tariff;
```

TABLE 5-continued

```
public class ExpAlgorithm implements tariff {
        private float min;
        private float base;
        private float divisor;
        private ExpAlgorithmDisplay display( );
        public ExpAlgorithm( ) {
                display = new ExpAlgorithmDisplay ( );
                setMin (new Float (1));
                setBase (new Float (2));
                setDivisor (new Float (10));
        }
        public float getPrice (int pkin, int pkout, int cng) {
                return     min     +     (float)math.pow
(base,(pkin + pkout + cng)/divisor);
        }
        public JComponent getGUI( ) {return display; }
        public void setMin (Float f) {
                min = f.floatValue( );
                display.setMin(min);
        }
        public void setBase (Float f) {
                base = f.floatValue( );
                display.setBase(base);
        }
        public void set Divisor (Float f) {
                base = f.floatValue( );
                display.setBase (divisor);
        }
}
```

TABLE 6

```
// Generated by Together
package algorithms.exp;
import java.awt.GridLayout;
import com.sun.java.swing JPanel;
import com.sun.java.swing.JTextField;
import com.sun.java.swing.Box;
import com.sun.java.swing.JLabel;
public class ExpAlgorithmDisplay extends Jpanel {
        private JLabel tfDisplay = new JLabel ( );
        private float min, base, div;
        public ExpAlgorithmDisplay ( ) {
                add (tfDisplay);
//              tfDisplay.setEditable (false);
                updateDisplay ( );
        }
        private void updateDisplay ( ) {
                tfDisplay.setText ("price = " + min + " + " + base +
"^((pkin + pkout + cng)/" + div +")");
        }
        public void setMin (float f) {
                min = f;
                updateDisplay ( );
        }
        public void setBase (float f) {
                base = f;
                updateDisplay ( );
        public void setDivisor (float f) {
                div = f;
                updateDisplay ( );
        }
}
```

TABLE 7

```
// Generated by Together
package algorithms.exp;
import java.awt.GridLayout;
import com.sun.java.swing.*;
import java.awt.event.*;
import com.bt.jungle.lsma.charging.pricing.provider.*;
import com.bt.jungle.util.*;
public class ExpAlgorithmGUI extends Jpanel {
```

TABLE 7-continued

```
        private JTextField tfMin = new JTextField ( );
        private JTextField tfBase = new JtextFfield ( );
        private JTextField tfDivisor = new JTextField ( );
        private TuningMessageListener tuningMessageListener;
        private final static String DEFAULT_MIN = "1.0";
        private final static String DEFAULT_BASE = "2.0";
        private final static String DEFAULT_DIV = "10.0";
        public ExpAlgorithmGUI (TuningMessageListener tml) {
            tuningMessageListener = tml;
            tfMin.setText (DEFAULT_MIN);
            tfBase.setText (DEFAULT_BASE);
            tfDivisor.setText (DEFAULT_DIV);
            Box vbox = Box.createVerticalBox ( );
            vbox.add (new JLabel ("price = min + pow (base,
(pkin + pkout + cng)/divisor)"));
            vbox.add (Box.createVerticalGlue ( ));
            Jpanel panel = new JPanel (new GridLayout (3,2));
            panel.add (new JLabel ("Minimum"));
            panel.add (tfMin);
            tfMin.addActionListener (
                new ActionListener ( ) {
                    public void actionPerformed (ActionEvent e) {
                        transmit ("setMin", tfMin);
                    }
                }
            };
            panel.add (new JLabel ("Base"));
            panel.add (tfBase)
            tfBase.addActionListener (
                new ActionListener ( ) {
                    public void actionPerformed (ActionEvent e) {
                        transmit ("setBase", tfBase);
                    }
                }
            };
            panel.add (new JLabel ("Divisor"));
            panel.add (tfDivisor);
            tfDivisor.addActionListener (
                new ActionListner ( ) {
                    public void actionPerformed (ActionEvent e) {
                        transmit ("setDivisor", tfDivisor);
                    }
                }
            );
            vbox.add (panel);
            add (vbox)
        }
        void transmit (String m, JTextField tf) {
            try {
                Float f = new Float (tf.getText ( ));
                Object args [ ] = new Object [1];
                args [0] = f;
                tuningMessageListener.notify(
                    new Invocation (m, args)
                );
            }
            catch (Exception e) {
                e.printStackTrace ( );
            }
        }
    }
```

What is claimed is:

1. A method of operating a communications network comprising:

applying only a single test to traffic entering the network, the test being applied at a point of access to the network, and the single test comprising examining one or more packets of data forming the traffic entering the network at the point of access, determining if any of the one or more examined packets may be illegitimate and designating any thus determined packet or packets as a suspicious packet or packets;

allowing the or each suspicious packet to enter the network; and checking after its admission on to the network to see if the or each suspicious packet is a permitted packet according to any agreement between an associated customer and an operator of the network, and if not, administering a retrospective punishment to the associated customer.

2. A method as in claim 1, wherein applying the test at the point of access to the network comprises:

forwarding all traffic entering the network and, in parallel, metering the forwarded traffic to check that it complies with a traffic conditioning agreement associated with the traffic; and if it is determined that the traffic does not comply with the respective traffic conditioning agreement, administering the retrospective punishment to the associated customer.

3. A method as in claim 2 wherein the metering is performed on a sampling basis whereby only a portion of the forwarded traffic is checked for compliance with a respective traffic conditioning agreement.

4. A method as in claim 2 wherein the forwarding is performed by a router and the metering proceeds on a memory copy of packet header information of the forwarded traffic, and the packet header information is stored in a memory of the router.

5. A method as in claim 2 wherein all-optical technology is used for forwarding the traffic, while samples of traffic are tapped off an optical flow of the all-optical technology to be policed in electronics out of band.

6. A communications network comprising:

a router forming an access point to the network, the router being operable to apply only a single test to traffic entering the network, wherein the test comprises examining one or more packets of data forming the traffic entering the network at the access point, determining if any of the one or more examined packets may be illegitimate and designating any thus determined packet or packets as a suspicious packet or packets, the router also being operable to allow the or each suspicious packet to enter the network; and a processing device for checking, after its admission on to the network, to see if the or each suspicious packet is a permitted packet as in any agreement between an associated customer and an operator of the network, wherein if the packet is not a permitted packet, the operator may administer a retrospective punishment to the associated customer.

7. A communications network as in claim 6 wherein:

the router forming the access point to the network is operable to forward traffic entering the network;

the router operable to apply the test includes a metering device for metering at least a portion of the forwarded traffic to check that it complies with a traffic conditioning agreement associated with the traffic;

wherein if it is determined that the traffic does not comply with the respective traffic conditioning agreement, an operator of the network may administer the retrospective punishment to the associated customer; and the metering is performed in parallel with the forwarding of the traffic.

8. A communications network as in claim 7 wherein the metering device is operable to meter only a portion of the forwarded traffic to check that it complies with a respective traffic conditioning agreement.

9. A communications network as in claim 7 wherein the metering device proceeds on a memory copy of packet header information of the forwarded traffic, and the packet header information is stored in a memory of the router.

10. A communications network as in claim 6 wherein the router employs all-optical technology for forwarding the traffic, while samples of traffic are tapped off an optical flow of the all-optical technology to be policed by the metering device in electronics out of band.

11. A computer program storage device readable by a machine, tangibly embodying a program of instructions executable by the machine to perform method steps for operating a communications network, the method comprising:

applying only a single test to traffic entering the network, the test being applied at a point of access to the network, and the single test comprising examining one or more packets of data forming the traffic entering the network at the point of access, determining if any of the one or more examined packets may be illegitimate and designating any thus determined packet or packets as a suspicious packet or packets;

allowing the or each suspicious packet to enter the network; and checking after its admission on to the network to see if the or each suspicious packet is a permitted packet according to any agreement between an associated customer and an operator of the network, and if not, administering a retrospective punishment to the associated customer.

* * * * *